(12) United States Patent
Lande

(10) Patent No.: US 6,280,781 B1
(45) Date of Patent: Aug. 28, 2001

(54) HOME YOGURT/CHEESE MAKING MACHINE

(76) Inventor: Arnold J. Lande, 3201 Snelling Ave., Minneapolis, MN (US) 55406

( * ) Notice: Subject to any disclaimer, the term of this patent is extended or adjusted under 35 U.S.C. 154(b) by 0 days.

(21) Appl. No.: 09/353,097

(22) Filed: Jul. 14, 1999

Related U.S. Application Data

(60) Division of application No. 09/183,833, filed on Oct. 30, 1998, now Pat. No. 6,012,383, which is a continuation-in-part of application No. 08/872,009, filed on Jun. 9, 1997, now Pat. No. 5,829,344.

(51) Int. Cl.$^7$ ........................................................ A23C 9/12
(52) U.S. Cl. ................................ 426/34; 426/42; 426/43; 426/580; 426/583
(58) Field of Search ................................... 426/34, 36, 42, 426/43, 580, 583; 99/453

(56) References Cited

U.S. PATENT DOCUMENTS

| | | |
|---|---|---|
| 3,369,596 | 2/1968 | Mareland . |
| 3,685,153 | 8/1972 | Borkton . |
| 3,921,961 | 11/1975 | Hapgood . |
| 3,946,657 | 3/1976 | Driessen et al. . |
| 4,009,368 | 2/1977 | Faivre . |
| 4,022,914 | 5/1977 | Moody . |
| 4,066,791 | 1/1978 | Corbin, Jr. . |
| 4,066,794 | 1/1978 | Schur . |
| 4,163,472 | 8/1979 | Taylor . |
| 4,195,561 | 4/1980 | Castanis . |
| 4,206,244 | 6/1980 | Schenk . |
| 4,212,236 | 7/1980 | Guillen . |
| 4,289,788 | 9/1981 | Cajigas . |
| 4,289,789 | 9/1981 | Cajigas . |
| 4,392,361 | 7/1983 | Cavalli . |
| 4,590,077 | 5/1986 | Trop . |
| 4,624,853 | 11/1986 | Rudin . |
| 4,664,529 | 5/1987 | Cavalli . |
| 4,719,113 | 1/1988 | Kharrazi . |
| 4,736,600 | 4/1988 | Brown . |
| 4,737,374 | 4/1988 | Huber et al. . |
| 4,802,407 | 2/1989 | Negri et al. . |
| 4,838,702 | 6/1989 | Tormisitsu et al. . |
| 4,885,917 | 12/1989 | Spector . |
| 5,054,383 | 10/1991 | Cho . |
| 5,145,697 | 9/1992 | Cajigas . |
| 5,363,746 | 11/1994 | Gordon . |

FOREIGN PATENT DOCUMENTS

| | | |
|---|---|---|
| 472501 | 4/1974 | (AU) . |
| 29 36 497 A1 | 3/1981 | (DE) . |
| 29 36 498 A1 | 3/1981 | (DE) . |

*Primary Examiner*—Leslie Wong
(74) *Attorney, Agent, or Firm*—Nikolai, Mersereau & Dietz, P.A.

(57) ABSTRACT

A kitchen appliance for preparing yogurt, soft frozen yogurt and ice cream, hard frozen yogurt and ice cream, and cheese. The appliance includes a housing having a base and side walls defining an open top. A motor-driven paddle device is rotationally journaled with respect to the cover and base and the motor therefor is adapted to be driven either continuously or with a predetermined duty cycle, dependent upon the product being made. Also mounted on either the cover or the base is a vent hole occluder that is normally positioned to block the vent holes in the cover or base, but which shifts to a second position uncovering those vent holes when the consistency of the product being produced, as tested by the paddle motion or other apparatus reveals that a predetermined cultured state has been reached. Shifting of the occluding device from the covering position to the open position also actuates a switch to shut off the drive motor and a warming element. When a frozen yogurt product is desired, a pre-chilled freezing bowl can be placed in the housing and the paddle used to scrape the frozen yogurt from the walls of the freezing bowl.

3 Claims, 9 Drawing Sheets

HOME YOGURT/CHEESE MAKING MACHINE

CROSS-REFERENCE TO RELATED APPLICATION

This is a Divisional of application Ser. No. 09/183,833, filed on Oct. 30, 1998, now U.S. Pat. No. 6,012,383, which is a continuation-in-part application of Ser. No. 08/872,009, filed Jun. 9, 1997, now U.S. Pat. No. 5,829,344.

BACKGROUND OF THE INVENTION

I. Field of the Invention

The present invention relates generally to kitchen appliances, and more particularly to a machine for automatically preparing any one of yogurt, soft frozen yogurt, hard frozen yogurt and cheese, at home.

II. Discussion of the Prior Art

Because of its taste and nutritional value, yogurt has been an increasingly popular food product. Many brand name yogurt products are available to the consumer in supermarkets. Traditionally, and because of the expense of these products, some consumers attempt to make yogurt at home. Warming devices for making yogurt at home are available and are discussed in the prior art. For example, U.S. Pat. No. 4,009,368 to Faivre et al. describes an electrically heated yogurt-making machine having an enclosure containing a receptacle into which boiled milk and a yogurt starter is placed. The enclosure contains an electrical heating element and a fusible material (wax) which is adapted to be heated to a melting point by the heating element. Heat from the melted wax is transferred to the milk container. The purpose of the wax is to provide a thermal mass exhibiting a temperature plateau at or near the optimum for incubating the bacteria used to transform the milk to yogurt.

The yogurt making process requires that the yogurt mix incubate relatively undisturbed for a somewhat unpredictable number of hours until the desired consistency and acidity is achieved. More frequent disturbance results in curdling of the milk product and the formation of cheese. If too high a temperature is employed, it accelerates the process to the point where it is difficult to catch the end-point where consistency and flavor are at their optimum. Traditional, home-based, room temperature yogurt techniques are slow, sometimes taking as long as 12 hours. The room temperature yogurt process does, however, offer the advantage of allowing it to be checked at reasonable intervals so that the incubation process might be terminated at or near its optimal point by initiating cooling. The incubation process can be accelerated to only about four hours by providing a warm environment for the yogurt mix, but if the optimal point is not detected accurately, the yogurt becomes more acidic and less palatable. Thus, considerable operator attention and care is required with prior art warming apparatuses.

The yogurt making appliances of the present invention obviate these problems. Specifically, the yogurt making machines of the present invention require no operator intervention or monitoring during the reasonably rapid, heating, cooling and warmed incubation process. The warming is automatically stopped at the desired point in the process with refrigeration being initiated automatically to terminate further incubation.

A further object and advantage of the present invention is that the same machine can be used to facilitate the preparation of frozen yogurt and ice cream as well as both cultured and artificially curdled cheese products.

SUMMARY OF THE INVENTION

The yogurt making appliances constructed in accordance with the present invention are particularly adapted for use in the home to automatically make yogurt, hard and soft frozen yogurt or ice cream and cheese products. There are at least six possible embodiments of these devices. The first, motor and detent (magnet) on top, is claimed in the above-referenced U.S. application and in European Union patent application 08/3043720. A second embodiment, motor and detent on the bottom, the third, motor on top and detent on the bottom, the fourth, motor on the bottom and detent on top, the fifth, motor and detent on the bottom with a center post and the sixth, motor on the bottom and detent on top with a center post, are described in the present specification.

The first embodiment, motor and detent on top, has an insulated container having a base and peripheral side walls defining a non-circular cross-section and an open top through which milk or dried milk and water is added to a yogurt starter, usually yogurt from the supermarket or a remanent of a previous batch.

One or more of (i) either the peripheral side walls, (ii) the base of the insulated container, and/or (iii) the paddle member have embedded therein or otherwise support an electrical or other warming element, such as a reversible, thermoelectric heating and cooling device and/or a nicrome filament that is adapted to apply warming to the contents of the container.

A cover member is configured to fit atop the peripheral side walls in covering relation to the open top of the container. The cover member includes at least one vent hole formed therethrough, along with a centrally located hole that is adapted to receive a paddle support shaft therethrough. The paddle support shaft has a rotating paddle secured to its lower end and the shaft for the paddle is sufficiently long so that when the paddle is disposed within the yogurt or cheese mix in the container, the shaft will pass upwardly through the central hole in the cover member.

Also disposed about the paddle support shaft and positioned atop the cover member is a rotatable occluding means for selectively covering and opening the vent hole(s) in the cover member. The means for selectively occluding and opening the vent hole(s) is releasably secured to the cover member by a detent, such that a predetermined force must be applied to the vent hole occluding means before it is able to move relative to the cover member.

Finally, at least one drive motor with a built-in gear reduction transmission is affixed to the vent hole occluding means for rotating the paddle support shaft and paddle relative to the stationary container to periodically test the contents in the container. When the paddle stalls due to gelling and thickening of the contents, the motor then causes the occluding means to move from a vent hole occluding position to an open position. The motor is adapted to be driven either with predetermined duty cycles or continuously, dependent on the product being made.

Shifting of the occluding device from the covering position to the open position also triggers a switch, shutting off the motor, timer and the warming element and activating a cooling element. Alternatively, if the optional vent cover is not utilized, then cooling can rapidly occur if the device is disposed in a household refrigerator with its electrical cord extending out past the conventional, soft, door seal gasket used in most refrigerators.

The culturing container may, as an option, contain a double walled freezing bowl having a cylindrical, microwave heatable stainless steel interior wall and a non-cylindrical outer wall when preparing frozen yogurt.

The second embodiment has its motor and detent beneath a rotatable, un-insulated, non-circular culturing container. A double walled freezing bowl having a microwave heatable stainless steel inner wall may be enclosed within the culturing container and both disposed within an insulated chamber, consisting of a housing, base and cover. The housing also supports a fixed, downwardly directed, heatable paddle that extends into the mix. The base incorporates an air vent opening and/or an electrical or other warming element, such as a reversible thermoelectric warmer/cooler, with fans, mounted therein. A centrally located hole is formed through the base that is adapted to receive a drive shaft therethrough from a motor mounted on a rotatable occluding member. A gear reduced electrical motor is carried by the occluder for driving the culturing container. The occluding member is movable from a first position in which the air vent in the base is occluded to a second position in which the air vent opening is uncovered. The movement occurs when the consistency of the product being produced, as tested by the container motion, increases the resistance of the container to rotation relative to the stationary paddle. The means for selectively occluding and opening the vent hole is releasibly secured to the base member by a detent, such that a predetermined force must be applied to the vent hole occluding means before it is able to move relative to the base member. The motor is adapted to be driven either with a predetermined duty cycle or continuously, depending on the product being made. Shifting of the occluding device from the vent hole covering position to the open position also actuates a switch for deactivating the drive motor and the warming and timing elements and activating the cooling element. Alternatively, cooling can rapidly occur if the optional vent cover is not utilized and the device is disposed in a conventional refrigerator with its electrical cord extending outward past the soft door seal gasket, as with the first embodiment.

The third embodiment has the motor on the top of the container and the detent located in the base. It, too, has a rotatable, non-circular culturing container designed to be used with or without a freezing bowl. The culturing container is enclosed within a fixed insulated chamber, consisting of an exterior housing, a base and a cover. The cover, which is fixed to the housing, has a centrally located hole that is adapted to receive a paddle support shaft therethrough.

The paddle support shaft has a heatable paddle secured to its lower end. The shaft for the paddle is sufficiently long so that, with the paddle disposed within the mix in the container, the shaft will pass upwardly through the central hole in the cover member.

At least one drive motor with a gear reduction mechanism is affixed to the cover for rotating the paddle support shaft and paddle relative to the container to periodically test the contents of the container. Electrical slip rings permit warming and heating of the rotating paddle. At least one mix-adding hole and/or automatic yogurt starter adding hole, with a plug, is also formed through the cover.

The base incorporates an air vent opening. A centrally located hole formed in the base is adapted to receive a supporting shaft to which the container and the occluder are joined. The container and occluder are jointly movable only from a first position occluding the air vent opening to a second position in which the air vent opening is uncovered. This occurs when the consistency of the product being produced, as tested by the paddle motion relative to the mix in the container or freezing bowl, increases the resistance to paddle rotation sufficiently to overcome the force exerted by the detent means used to releasibly secure the yogurt container (and/or freezing bowl) and occluding member to the base.

The paddle motor is adapted to be driven either according to a predetermined duty cycle or continuously, according to the product being made. Shifting of the container and occluding member from the covering position to the open position also actuates a switch, shutting off the drive motor and timer and the thermoelectric warming element and activates the cooling element. Alternatively, cooling can rapidly occur if the optional vent cover is not utilized and the device is disposed in a refrigerator with the yogurt maker's electrical cord extending outward past the soft door seal gasket.

In a fourth embodiment, the motor is disposed in the base and the detent mechanism is on the top. It incorporates a rotatable culturing container, and optionally, a double-walled freezing bowl having a non-circular exterior and a stainless steel inner wall. Either or both are adapted to be enclosed within an insulated chamber consisting of a fixed, insulated, exterior housing, a base member and a cover. The cover is configured to fit firmly atop the housing and it includes at least one vent hole with an optional cover, and at least one pluggable mix adding hole. The cover also has a centrally located hole containing a bearing for journaling a paddle support shaft. The paddle support shaft has a paddle secured to its lower end and the shaft for the paddle is sufficiently long so that with the paddle disposed within the mix in the culturing container, the shaft will pass upwardly through the bearing in the cover member.

Also attached firmly to the paddle support shaft and positioned in relation to the cover member is a means for selectively occluding and opening the vent hole in the cover member. The means for selectively occluding and opening the vent hole is releasibly secured to the cover member by a detent, such that a predetermined force must be applied to the vent hole occluding means before it is able to move relative to the cover member. A coiled conductive ribbon or otherwise supple electrical wire connection serves to conduct electricity to the paddle for warming/heating same.

The base contains an electrical heating element and/or a reversible thermoelectric warmer/cooler mounted therein. A motor with reduction gears is connected in driving relation with respect to the container. The occluding member mounted on the cover is movable with respect to the cover from a first position in which the air vent opening in the cover is occluded to a second position in which the air vent opening in the cover is uncovered. This again occurs when the consistency of the product being produced, as tested by the container motion, increases the resistance to rotation of the container against the paddle. The motor is adapted to be driven either according to a predetermined duty cycle or continuously, depending on the product being made. Shifting of the occluding device from the covering position to the open position also activates a switch, cutting off the drive motor and the warming element and activating a cooling element. Alteratively, cooling may rapidly occur if the optional vent cover is not utilized, and the device is dwelling in the refrigerator as previously explained.

In the fifth embodiment, the motor and detent are disposed in the unit's base. It has an insulated outer housing mounted on the base and its peripheral side walls define a chamber of a non-circular cross section and an open top through which whole milk or dried milk and water, or other constituents commonly used in preparing yogurt may be added to a yogurt starter, usually yogurt from the supermarket or a remanent of a previous batch. One or more of either the peripheral side walls or the base and/or the paddle member have embedded therein or otherwise support a warming and heating element, such as a tungsten filament. A reversible heat pump (thermoelectric heater/cooler) that is adapted to apply warming, and/or cooling, to the contents of the container may be employed as well. A cover member is configured to fit atop the peripheral side walls of the outer container in covering relation to its open top. The cover member includes at least one electrical connection with the housing and at least one slip-ring electrical connection with the rotating paddle or the center post. The outer housing has an integrally molded, tubular center post which has a centrally located sleeve-bearing that is adapted to receive a paddle support shaft therethrough. The paddle support shaft has a retainer preventing it from slipping downward. A rotating split paddle member is secured to its upper end. The paddle blades are sufficiently long so that they extend downwards into the yogurt or cheese mix placed in the container when used.

Also disposed around the paddle support shaft in the base is a motor, detent magnet and reed switch magnet supporting means. This supporting means is releasibly secured to the base member by the detent, such that a predetermined force must be applied to the aforementioned supporting means before it is able to move in relation to the base member.

Finally, at least one drive motor with a gear reduction mechanism is affixed to the supporting means for the rotatable motor, detent magnet and reed switch magnet for rotating the paddle support shaft and paddle relative to the stationary housing to thereby periodically test the contents in the chamber of the housing. The motor also rotates the supporting means, detent magnet and reed switch magnet with respect to the container upon the thickening of the contents in the container. The motor is adapted to be driven either with predetermined duty cycles or continuously, dependent on the product being made.

The culturing container may have a double walled freezing bowl inserted into it. The freezing bowl has a cylindrical, microwave heatable stainless steel interior wall and a non-cylindrical outer wall. Shifting of the detent magnet and reed switch magnet supporting device also triggers a switch, shutting off the motor, timer and the warming element and activating a cooling element.

In a sixth embodiment, the motor is disposed in the base and the detent is on the unit top. It has an insulated outer housing supported on a base, peripheral side walls defining a non-circular cross-section and an open top through which whole milk, dried milk plus water or other yogurt constituents are added to a yogurt starter, usually yogurt from the supermarket or a remanent of a previous batch. Integrally molded with the outer housing is a tubular center post. One or more of either the peripheral side walls or the base or the center post, and/or the paddle member have embedded therein or otherwise support an electrical or other warming and/or heating element or reversible, thermoelectric heat pump that is adapted to apply warming or cooling, to the contents of the container. A cover member is configured to rotate atop the peripheral side walls in covering relation to the open top of the container. The cover member includes at least one vent hole (and at least one automatic starter adding hole) formed therethrough, along with a centrally located hole that is adapted to receive a stub shaft on an occluder member therethrough. The cover has rotating paddle blades secured thereto which are sufficiently long so that they extend into the yogurt or cheese mix placed in the container during use. Slip rings connect the center post electrically with the cover. Also disposed about the occluder stub shaft and integral therewith is an occluding means for selectively covering and opening the vent hole in the rotating cover member. The means for selectively occluding and opening the vent hole is again releasibly secured to the cover member by a detent, such that a predetermined retarding force must be applied to the paddle before the occluder is able to move independent of the cover member. Finally, at least one drive motor with a gear reduction mechanism is affixed to the base for rotating the paddle support shaft within the tubular center post-sleeve. The motor is adapted to be driven either with predetermined duty cycles or continuously, dependent on the product being made. Periodic rotation of the top and its attached paddle tests the consistency of the contents in the container. As it thickens, the occluding means rotates away from a vent hole occluding position to an open position.

The culturing container may further contain or be replaced by a double walled freezing bowl having a cylindrical, microwave heatable stainless steel interior wall and a non cylindrical outer wall. Shifting of the occluding device from the covering position to the open position also triggers a switch, shutting off the motor, timer and the warming element and/or activating the cooling element. Alternatively, if the optional vent cover is not utilized, cooling can rapidly occur with the device dwelling in the refrigerator with its electrical cord extending out past the soft, door seal gasket.

When preparing yogurt, the machines of the present invention will preferably be placed on the kitchen counter, but may also, in most cases, be placed within the cooling compartment of a household refrigerator with the power cord for energizing the unit's motor and timing and heating/cooling elements extending out the door to a wall outlet. A solid-state timer is included as a part of the appliance for periodically energizing the motor(s) with a predetermined duty cycle whereby at relatively long periodic intervals, e.g., about every 15 minutes, the motor is energized for a relatively short time interval, e.g., about two seconds. This causes relative movement of the paddle with respect to the non-circular container, resulting in the consistency of the contents of the container being tested at infrequent intervals. As the incubation of the milk and yogurt starter continues in the warmed environment, a point will be reached where the mixture begins to rapidly gel. Under gelled conditions, the paddle and container will become locked against relative rotation and this results in the occluding means rotating from a vent hole occluding position to a vent hole open position. The rotation of the occluding means in the manner described also causes an electrical switch to open, shutting off power to the motor and to the warming element. With the power off and the vent hole open, cool air from the refrigerator will quickly absorb the heat energy within the appliance, terminating the culturing process. Alternatively, cooling can be achieved by having the switch reverse the polarity of the voltage applied to a thermoelectric heat pump.

The yogurt and cheese making container is preferably designed to have a non-circular periphery around its open upper end and around its inner peripheral side walls so that the gelled and curdled products provide a resistant lock between the paddle and the container.

In the first embodiment described, the cover may also be placed atop the container in any one of four positions. It has been found convenient to place a plurality of electrical switch actuators atop the wall of the container and surrounding the opening therein and then provide mating electrical switch contacts on the cover member such that when the cover is placed on the container in a first of the four possible positions, it causes the appliance to operate in a mode to produce yogurt. When the cover is rotated 90° and placed atop the container, only switches for causing the appliance to operate in a mode for producing soft frozen yogurt or ice cream will be actuated. Similarly, another 90° rotation of the cover relative to the container will result in only those switches for causing the appliance to produce hard frozen yogurt or ice cream to be actuated. The fourth possible position of the square cover relative to the square base will cause only those switches to be actuated whereby the appliance can be used to produce Ricotta cheese. Other alternative types of switching panels might be utilized. The cover and container of a device utilizing the switching scheme just described are appropriately color coded or otherwise marked to facilitate selection of a desired operating mode.

When the appliance of the first configuration of the present invention is to be used in preparing frozen yogurt or ice cream, the cover is placed on the container's open top in a different orientation such that cooperating switch and switch actuating devices on the container and cover disconnect the heating element from its source of power. A previously chilled freezing bowl dimensioned to fit into the opening in the container is removed from the refrigerator's freezer compartment and inserted into the opening of the container or inserted independently and rotation is commenced. The previously prepared mix is then poured into the freezing bowl, while the drive motor(s) are permitted to continuously drive either rotating paddle or container such that the frozen yogurt mix forming on the cylindrical inner wall of the freezing bowl is continuously scraped therefrom. The relative rotation of the container with respect to the paddle continues until the resistance on the paddle due to the presence of the hard or soft frozen yogurt overcomes stronger predetermined retaining forces to again allow the occluding means to rotate to the position wherein the electrical switch for applying power to the motor is opened.

When the appliance of the present invention is to be used in making agglutinated curd (Ricotta cheese), provision is made for the more nearly continuous rotation of the paddle in a warmed yogurt mix, stopped only about every 15 minutes for a shorter pause (about 5 minutes). A yogurt culture, which is stirred relatively continuously, agglutinates and forms a curd which, if subsequently not stirred, may settle as a firm mass sticking to the bottom of the irregular shaped container or, if stirred, may attach to and shrink on the stirring paddle, forming a ball. When the paddle increasingly becomes mired in an agglutinating mass which is attaching to the irregular shaped container, it causes a force resisting movement of the paddle. When the paddle, with an attached curd-ball, abruptly re-accelerates from a stop to a turning movement, the inertia of the curd ball on the paddle similarly causes a transient force sufficient to overcome the predetermined force between the occluding means and the cover so that the device opens up the vent hole in the cover and turns off the motor and timer and warming and/or may reverse a heat pump.

DESCRIPTION OF THE FIRST EMBODIMENT

Figure 1:
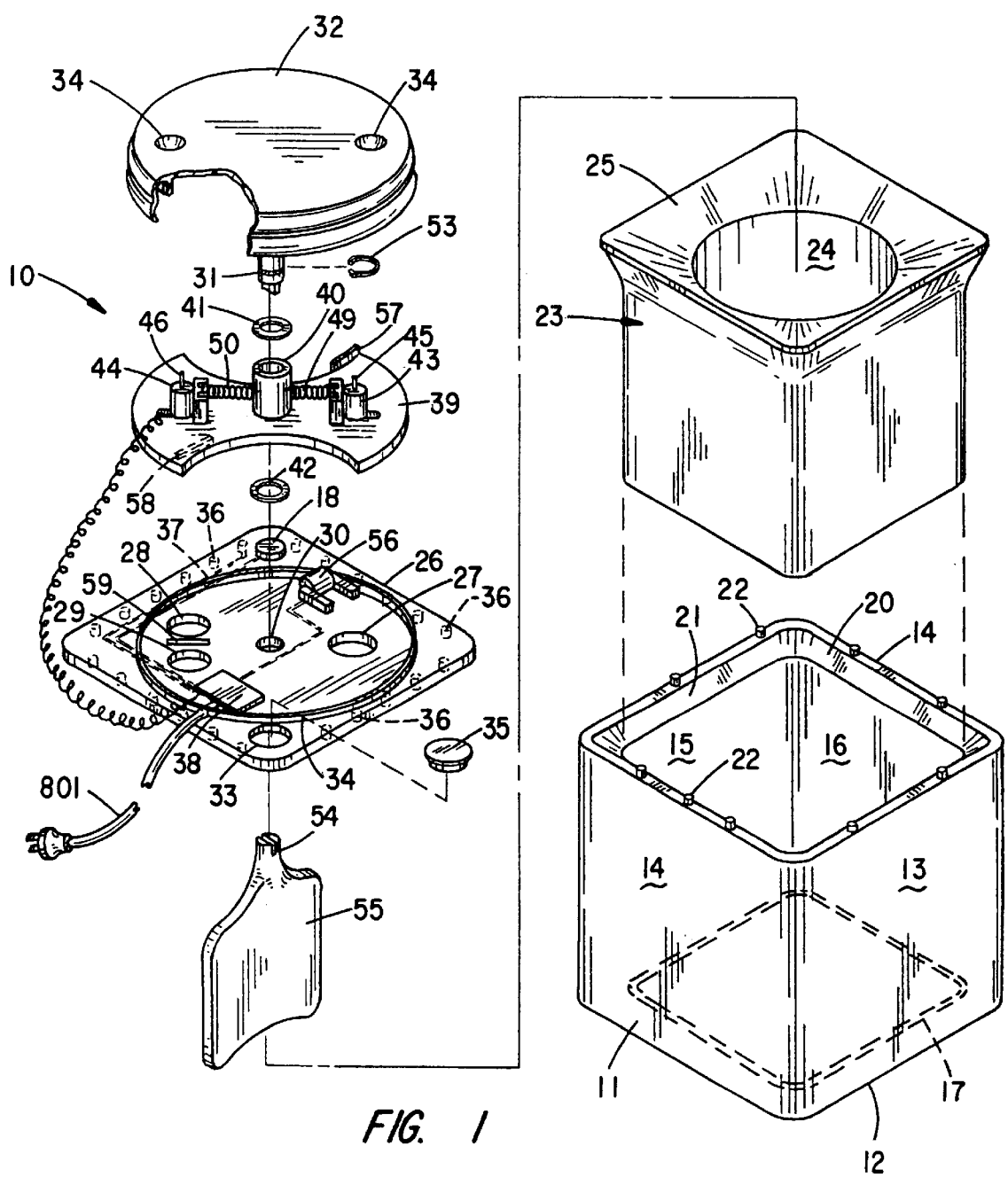
FIG. 1 is an exploded view of the first embodiment home yogurt/cheese making machine.

Referring first to FIG. 1, there is indicated generally by numeral 10 a home appliance useful in preparing yogurt, soft or hard frozen yogurt or ice cream, and cheese from a starter and either pre-heated bottled milk or a mixture of dried milk and water as well as other ingredients for providing a desired taste and consistency. It is recognized that yogurt can be prepared from non-dairy products. Hence, the term "milk product" as used in the present application is intended to include both dairy and non-dairy products from which yogurt can be produced. The machine is seen to comprise a base container 11 of generally square configuration defined by a bottom 12 and four mutually perpendicular side walls 13, 14, 15 and 16. The container 11 will preferably be molded from a suitable plastic and incorporated into the walls 13, 14, 15 and 16 and/or the bottom 12 is a thermostatically controlled warming element 17, here shown as an elongated coil or serpentine arrangement of a nicrome wire that is arranged to warm the interior and, therefore, the contents of the container. A reversible thermoelectric heat exchanger for both warming and cooling might also be utilized. Other warming and heating element arrangements may be embedded in the paddle. The thermostat control is identified by numeral 18 in the drawings. As used herein "warming" is intended to mean raising or maintaining the temperature of the milk product to a culturing temperature which may be between about 113° F. while "heating" involves bringing the milk product to about 203° F.

The four walls 13–16 define an open upper top 19 having downwardly and inwardly sloping edges as at 20 and 21. The mutually perpendicular side walls 13–16 and the bottom 12 are preferably formed of materials and insulation so that the heat energy derived by passing electrical current through the warming/heating element 17 will be inwardly directed. The upper edges of the four side walls include a plurality of post-like protuberances, as at 22, which are spaced or otherwise distributed at predetermined intervals and, as will be further explained, function as electrical switch actuators.

Disposed above the base container 11 in the exploded view of FIG. 1 is an optional freezing bowl 23 that is used when preparing such products as hard or soft frozen yogurt or ice cream. The freezing bowl, which is also of a square outer shape, is dimensioned to be insertable into the base container 11. The freezing bowl 23 has a substantially cylindrical inner wall 24, preferably formed from microwave heatable stainless steel or aluminum. The inner wall may have a non-stick coating, such as Teflon, thereby to facilitate release of frozen product therefrom. Disposed between the cylindrical inner wall 24 and the square outer wall and nearly filling it is a chemical mixture exhibiting a low freezing point, a relatively high latent heat of fusion and a low coefficient of expansion. This material, when initially frozen, is capable of absorbing heat from the container contents over a reasonable period sufficient to cause the contents to freeze. The double-walled freezing bowl 23 has an inwardly and downwardly sloping surface 25 leading to the cylindrical chamber 24. Prior to use, the insert 23 is adapted to be placed in the freezing compartment of a household refrigerator and chilled until the chemical material contained between the walls becomes frozen.

Sized to fit atop the rim of the base container 11 is a cover member 26, preferably fabricated from a suitable insulated plastic and having a vent opening(s) 27, 28 and 29 formed through the thickness dimension thereof. A further central opening 30 is also provided for receiving the shaft 31 of a motor-driven drive member 32 therethrough. The square cover 26 further includes an additional opening 33 through which liquid ingredients may be poured into the freezing bowl 23 when the cover is in place thereon and the paddle is turning. The opening 33 is vertically aligned with the sloped upper edges of the freezing bowl so that when material is poured through the opening 33, it will flow into the freezing bowl. An integrally molded, upwardly projecting annular wall 34 on cover 26 is designed to cooperate with the downwardly depending rim on drive member 32 to act as a baffle against inadvertent spillage when pouring ingredients into opening 33. A snap-in, removable cap 35 is used to seal the opening 33.

Positioned about the periphery of the cover 26 on the lower surface thereof are a plurality of cavities comprising normally opened switch contacts, as at 36, and which are positioned so as to cooperate with the switch actuating pins 22 on the upper edge of the base of container 11. The switch contacts 36 may comprise conventional diaphragm-type switches, each comprising first and second layers of metallization that are spaced apart from one another by an aperture insulating strip. One of the layers of metallization is deposited on a plastic (Mylar) membrane that when deformed through the aperture in the spacer layer, engages the second layer of metallization. Thus, when the cover 26 is assembled atop the base or container 11, only those diaphragm switches 36 which are aligned with a switch actuator 22 will have their contacts closed. The switch contacts are adapted to be connected, via printed or other wiring 37, to a control circuit 38 also mounted on the cover 26. Rather than utilizing diaphragm switches, the switch actuators 22 themselves may be metal covered and function as a first electrical contact designed to cooperate with second contacts formed in recesses on the undersurface of the cover 26.

Figure 2:
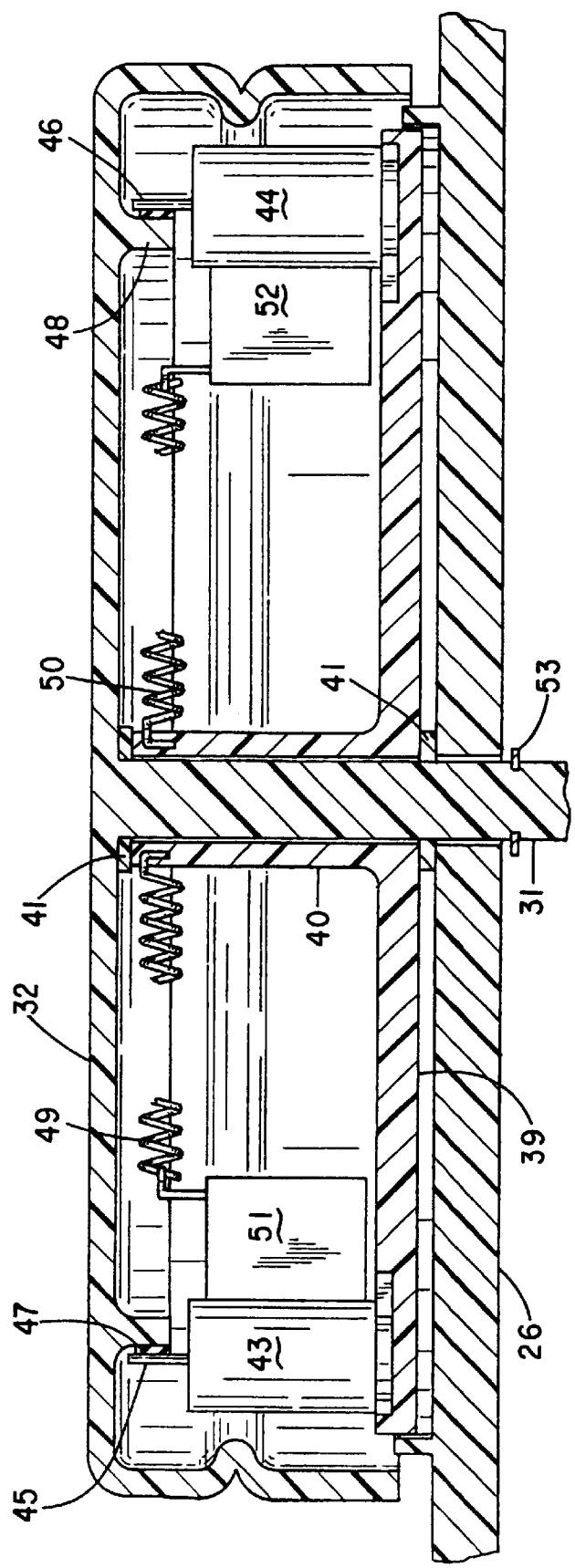
FIG. 2 is a partial cross-sectional view of the first embodiment apparatus of FIG. 1.

Disposed atop the cover 26 and loosely surrounding the shaft 31 of the drive member 32 is an occluding member 39 having an integrally formed sleeve bearing 40 centrally disposed thereon. Washer-type spacers 41 and 42 fit over shaft 31 on opposite ends of the sleeve bearing 40 to prevent frictional engagement between the occluder 39 and cover 26 and drive member 32. A pair of electrical drive motors 43 and 44 are mounted on the occluding member 39. As best seen in the enlarged view of FIG. 2, the motor 43 and the motor 44 are slide mounted on the occluding member 39 and have shafts 45 and 46, respectively, frictionally engaging an elastomeric band 47 deployed about an annular projection 48 that extends downwardly from the undersurface of the drive member 32.

Tension springs 49 and 50 are operatively coupled via the magnetic cores 51 and 52 of the motors 43 and 44 as well as to the sleeve bearing 40 of the occluding member 39. The springs function to maintain the motor shafts 45 and 46 in firm engagement with the elastomeric friction band 47 surrounding the annular projection 48 to inhibit slippage of the motor shafts on the friction band. A C-clip 53 holds the drive member, occluding member and cover together as a unit.

The paddle support shaft 31 is adapted to be coupled to a stub shaft 54 on a paddle member 55. During use, the paddle is disposed within the container 11 and adapted to be driven by the drive shaft 31 when the motors 43 and 44 are simultaneously energized. The machine of the present invention may also be constructed so that a warming/heating element may be contained in the paddle with slip-ring contacts for coupling electrical power thereto.

The control circuit 38 disposed on the cover 26 is also wired to an electromagnet 56 having first and second coils of differing numbers of turns such that at least three different magnitudes of magnetic attractive force can be applied for respectively causing a relatively moderate magnetic attraction to a weak permanent magnet 57 on the occluder 39 or, alternatively, two selectively greater attractive forces. Reciprocally, the permanent magnet 57 can apply a weak attractive force to the core of the inactive electromagnet 56.

The occluding member 39 is arranged to shift between first and second positions. In the first position, the occluding member 39 blocks the vent holes 27, 28 and 29 and in its second position uncovers those holes to expose the contents of the machine within the container 11 to the cooling temperature of a refrigerator in which the machine may be placed during use. When in the first position, a permanent magnet embedded in the occluding member 39 and identified by numeral 58 cooperates with a magnetic reed switch 59 disposed on the cover 26 to maintain the reed switch 59 closed. When the occluding member 39 is made to shift to its second position, the reed switch 59 is no longer under the influence of the permanent magnet 58 and its contacts open.

Figure 8:
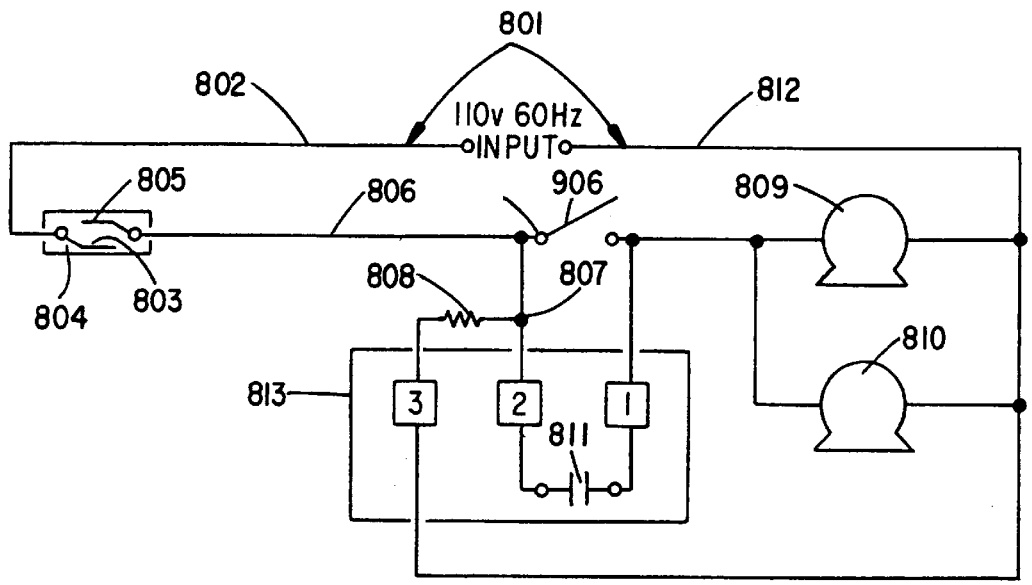
FIG. 8 is a schematic diagram of the electrical controls of the basic machine when used only for preparing yogurt or cheese.

Referring now to the circuit diagram of FIG. 8, there is shown a circuit arrangement that may be used if the machine is only to be used in making yogurt or cheese. A power cord 801 has its input prongs adapted to be connected to a source of household current. A first insulated conductor in the power cord 802 connects to a first normally open contact 803 of the magnetic reed switch 804 (59 in FIG. 1) and its second contact 805 is connected by a conductor 806 to a junction point 807 to which one side of the warming/heating element 808 (17 in FIG. 1) is attached. The second conductor of the power cord 812 is connected through terminal point 3 within the control module 813 to the remaining terminal of the warming/heating element 808. The junction 807 is also connected to terminal point 2 within the controller module. The drive motors 809 and 810 (43 and 44 in FIG. 1) are connected in parallel between the conductor 812 and a terminal point 1 in the controller module 813. A set of normally open timer operated contacts 811 are connected in series between terminal points 1 and 2. While mechanical switch contacts 811 are depicted in the drawings, the controller 813 will typically be a solid state device that will be biased to either a conducting or non-conducting state.

In use for preparing non-frozen yogurt, a yogurt starter and either previously heated bottled milk or dry, powdered milk plus warm water, is poured into the container 11 and the upper assembly, including the paddle 55, the occluding member 39, the drive member and the rectangular cover 26 are placed, as a unit, atop the container 11 and the drive member 32 is manually rotated in the counterclockwise direction (when viewed as in FIG. 1) by placing a finger in the recess 34 formed in the exposed upper surface of drive member 32 to thereby rotate the occluding member to which it is effectively locked, to the occluding member's initial position blocking the vent openings 27, 28 and 29 formed through the cover 26. The assembly is then placed within a refrigerator with the power cord 801 extending through the flexible rubber seal of the refrigerator door and then plugged into a wall outlet. With the occluding member 39 in the position to occlude the openings 27, 28 and 29, the permanent magnet 58 embedded in the occluder will cause the contacts of the normally open reed switch 59 (804 in FIG. 8) to be closed. As such, current will flow through the warming/heating element 17 (808) to maintain the warmth of the milk/starter mix within the container 11 at a desired culturing temperature. At this time, permanent magnet 57 is attracted to the iron of the unenergized electromagnet 56 (901 in FIG. 9) with a relatively weak force.

At relatively infrequent intervals, the timer control 813 will cause the contacts 811 to close for a relatively short interval. Without limitation, the contacts 811 may close about every 15 minutes for a time interval of about two seconds. When the contacts 811 close, an electrical current is supplied not only to the warming/heating element 17 (808), but also to the motors 43 and 44.

Upon energization of the motors 43 and 44, the drive member 32 will be rotated in the counterclockwise direction to also rotate the paddle 55 within the liquid mixture to thereby test the consistency of the constituents. After a few hours, the yogurt mixture will convert from a liquid to a somewhat firm gel. This transition occurs relatively rapidly.

Now, the next time that the timer contacts 811 are made to close, the motors 43 and 44 will attempt to rotate the drive member 32 and the paddle 55 which are keyed to one another. Because of the square shape of the container 11, the paddle 55 will not only be unable to rotate within the gel but will also be unable to twirl the gelled yogurt and, as a result, the motors affixed to the occluding member 39 will overcome the relatively weak magnetic force provided by magnet 57 and will cause the occluding member 39 to rotate clockwise so as to uncover the vent openings 27, 28 and 29 and simultaneously cause the contacts 803, 805 of the magnetic reed switch 59 to open. Opening of the contacts 803 and 805 disconnects both the warming/heating element 17 and the controller/timer 813 from the power source and thereby shuts off the motors 43 and 44 in FIG. 1.

Exposure of the gelled yogurt in the container 11 to the cool air within the refrigerator, via the vent openings 27, 28 and 29, will allow the contents to cool rather rapidly, thereby terminating the warming process at a time when the consistency and flavor are optimum. Alternatively, the reversible thermoelectric heat exchanger is switched to cooling mode.

In making cheese, the controller is re-programmed so that the motors 43 and 44 run more continuously and the warming element 17 is also energized. Rather than continuous rotation, in the preferred mode for cheese making, the cycle allows about 15 minutes of rotation followed by about 5 minutes of interruption—long enough for the curd to settle and begin to agglutinate into a resistant mass. The cheese curd mass inhibits rotation of the paddle 55. This causes the motors to now rotate the occluding means, opening the reed switch 59 and disconnecting power from the motors and warming element. The contacts 811 may open, for example, about every 15 minutes for a time interval of about five minutes. When the paddle, either with its attached curd-ball or mired in a firm or semi-firm mass, reaccelerates, the inertial or resistance force is sufficient to overcome the predetermined weak force between the occluding means and the cover so that the device opens up the vent hole(s) in the cover and turns off the motor and the timer and the heating element.

The operation thus far described involves the making of regular yogurt and cheese. By configuring the circuit as in the diagram of FIG. 9, additional capability is provided to the apparatus of FIG. 1. Specifically, it can be used to prepare not only yogurt and cheese, but also soft and hard frozen yogurt or ice cream.

When it is desired to make soft frozen yogurt, the optional insert 23 is utilized. The freezing bowl 23 will have been thoroughly chilled in a freezer or in the freezing compartment of the refrigerator before it is placed into the base container 11. Rotation is started and previously prepared frozen yogurt mix is then poured into the cylindrical cavity of the freezing bowl 23, via access port 33 formed in the cover 26. Also, the cover 26 will have been installed on the base container 11 in a different orientation than when the machine is being used to create yogurt in the first instance. As will be explained, the repositioning of the cover 26 relative to the base container 11 will result in different modes of operation.

Figure 9:
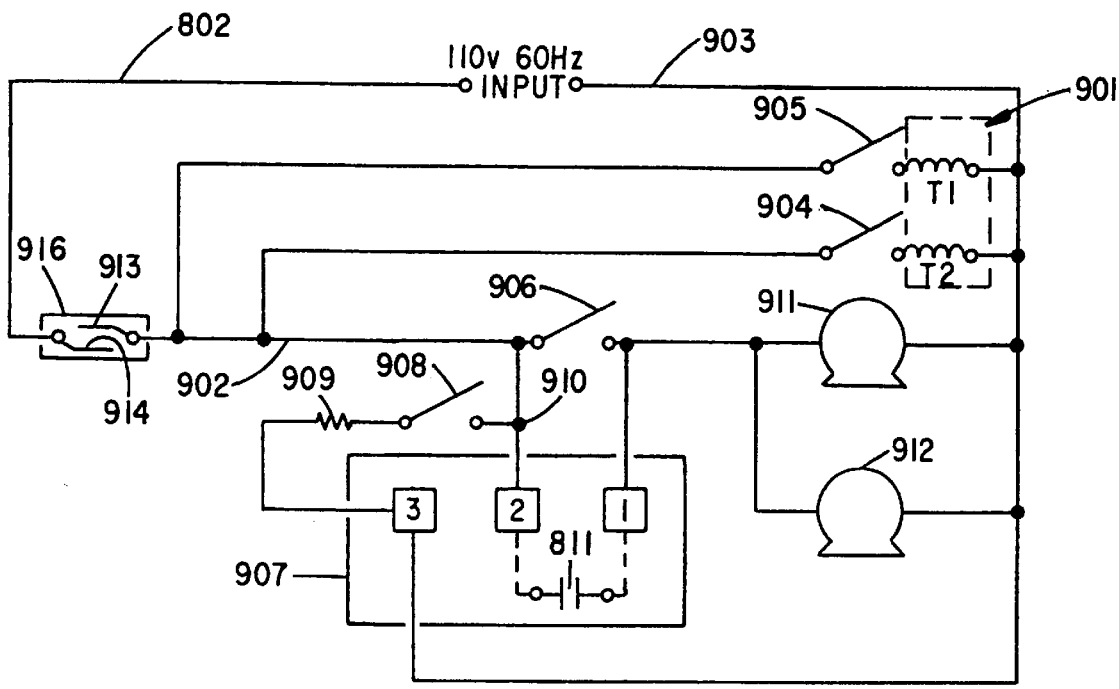
FIG. 9 is a schematic diagram of the electrical circuitry incorporated in the machine for selectively preparing one of yogurt, hard and soft frozen yogurt or ice cream and cheese products.

FIG. 9 is a schematic electrical diagram of the apparatus of the present invention when designed for additional or multiple use application. In this arrangement, the electromagnet 56 of FIG. 1 is represented by two coils labeled $T_1$ and $T_2$ of electromagnet 901. The coils $T_1$ and $T_2$ are adapted to be connected between the conductor 903 of the AC supply line when switches 904 and 905 are closed. In addition, a bypass switch 906 is provided which effectively removes the timer control 907 (38 in FIG. 1) from the circuit when it is closed.

The electromagnet 901 has fewer turns on coil $T_1$ than it does on coil $T_2$ and, as a result, the electromagnet 901 provides a lesser restraining force to the occluder 39 when the switch 905 is closed than is afforded when switch 904 providing energization to the coil $T_2$, is closed.

It is to be further noted that a single pole, single throw normally open switch 908 is connected in series with the warming element 909 (17 in FIG. 1) between terminal 3 of the timer control 907 and junction point 910.

The open/closed state of the switches 904, 905, 906 and 908 is determined by the orientation of the cover 26 relative to the top of the container 11. When making regular yogurt, the switch actuator pins 22 will cooperate with the cover such that switch contacts 904, 905 and 906 remain open while contact 908 is closed. However, when making soft, frozen yogurt, the cover will be positioned such that the switch actuators 22 will cooperate with the switches 904, 906 and 908 so that contacts of switch 904 will be closed, 905 will be open, 906 will be closed and 908 will be open. As such, motors 911 and 912 (43 and 44 in FIG. 1) will operate continuously. With switch 908 open, no current will flow through the warming element 17. As the paddle is continuously driven within the cylindrical chamber 24 of the freezing bowl 23, when the yogurt freezes on the walls of the chamber 24, it will be scraped off by the continuously rotating paddle 55 and will be mixed with the still somewhat liquid frozen yogurt mix remaining in the chamber. Of course, it is also possible to provide the desired scraping action by rotating the container 11 relative to a stationary paddle disposed in the cylindrical chamber, as in other embodiments yet to be described.

Once the consistency of the soft frozen yogurt becomes sufficiently stiff to overcome the attractive force due to current flowing through the coil $T_1$, the occluder 39 will again rotate due to the stalled condition of the paddle 55. The occluder will again reposition so as to open the reed switch contacts 913 and 914 to disconnect the motors 911 and 912 and to remove current from the coil $T_1$. While not shown, it is also contemplated that the machine of the present invention be provided with an audible signaling device which would sound so that the soft frozen yogurt can be removed from the freezing bowl 23 before the yogurt becomes more firm due to the freezing action of the insert. Freezing of soft frozen yogurt to the inner wall of the bowl while attempting removal of the product can be countered by placing the bowl with its microwave-heatable, smooth-contoured, stainless-steel inner cylinder in a microwave oven and heating it briefly. A Teflon® lining might also be utilized.

When the machine of the present invention is to be used to produce hard frozen yogurt or ice cream, the freezing bowl 23 is again used, but the cover will now be repositioned on the base container 11 such that the switch actuators 22 cooperate with the switches 36 on the cover 26 to cause switches 905 and 906 to be closed and switches 904 and 908 to be open, or switches 904 and 905 may both be closed. Also, the machine of the present invention may be inserted into the refrigerator's freezer compartment and the vent cover removed to permit access by ambient air. Given the fact that the coil $T_2$ of the electromagnet 901 (56 in FIG. 1) has a greater number of turns than the coil $T_1$ which is active in making soft frozen yogurt, the cover 26 and the occluder 39 will be attracted to one another with an increased force. With switch 908 open, the heating element 909 is not energized. Also, because switch 906 is closed, the timer circuit 907 is no longer functional and the motors 43 and 44 will run continuously, until such time as the magnetic reed switch 914 opens. As heat energy is removed from the yogurt mixture within the cylindrical compartment 24 of the freezing bowl 23 by the chemical contained between the walls of the insert and by the action of the refrigerator's freezing compartment, the yogurt will become more and more firm until a point is reached wherein the scraper paddle 55, in attempting to scrape and stir the freezing yogurt, will overcome the force exerted by the coil $T_2$ of the electromagnet and the motors will then drive the occluding means 39 on which they are mounted so as to cause the magnetic reed switch contacts 913 and 914 to open and thereby disconnect the motors and the coil $T_2$ from the power lines.

Again, removal of the frozen product from the bowl 23 may be facilitated by briefly placing the freezing bowl with its microwave heatable inner cylinder and its frozen contents into a microwave oven and heating it for a short time sufficient to melt the bond of the yogurt to the wall of the bowl. If, after the hard frozen process has completed, the device has remained in the freezing compartment of the refrigerator and a hard block with the paddle frozen in has resulted, then the heating coils in the paddle can be activated to facilitate its extraction.

When the machine of the present invention is to be used in making Ricotta cheese, the freezing bowl is not used and the motors 43 and 44 run with a duty cycle in which they remain on for a relatively long interval and off for a somewhat shorter interval. The warming element will remain energized and the weak magnet 57 will provide the attractive force between the cover 26 and the occluding member 39. Stated otherwise, the cover 26 will be positioned on the container such that the switch actuators 22 on the container will cooperate with the switches 36 to cause switch 904 to be open, 905 to be open, 906 to be open, and 908 to be closed. The milk and starter will be placed in the container 11 and the occluding member positioned so as to occlude the openings 27, 28 and 29 in the cover and to cause the magnetic reed switch contacts 913 and 914 to be closed. Because the mixture is being warmed, and largely, if not continuously stirred by the paddle over prolonged periods of time, a point will be reached wherein the mixture begins to flocculate and curdle and it may agglutinate into a rather firm mass on the bottom of the container if stirring ceases for a time. Also, some mixtures may tend to aggregate and form a curd ball on the paddle itself. When this process is complete to the point where the mass of the curd ball adds sufficient inertia to inhibit rotation of the paddle or an attempt to restart the paddle movement following an interruption in its rotation by opening of the timer switch 915 (811 in FIG. 8), the attractive force afforded by the permanent magnet 57 will be overcome and will result in the occluding member 39 shifting in position, due to the action of the motors, to the point where the magnetic reed switch 916 (804 in FIG. 8) again opens to thereby disconnect the heating element 909 and the motors 911 and 912 from the power source.

Rather than using a friction drive between the motor shafts and the elastomeric band on the drive member, an arrangement of gears driven by a single motor may be used instead.

Further, and as is mentioned in the foregoing specification, a heating (and warming) element may be located in the paddle member rather than in the walls of the container 11. This would afford the additional advantage of allowing the paddle to be extracted from hard frozen yogurt or ice cream by heating the paddle for a short interval to melt the ice cream at its interface with the paddle. Any of a variety of electrical slip ring contacts can be used to provide electrical energy to a heating element in a rotating member. Another modification would be to sense changes in the current drawn by the motors as the consistency of the product varies from a liquid to a gel or to a solid and to use that sensed current change to shut off the current to the warming element and to the drive motor(s) and to switch on cooling by the reversible thermoelectric warmer/cooler. A safety switch may also be incorporated which would shut down all possibility of current flow whenever the cover is removed. A reduced voltage may be utilized for all functions to avoid electrical shock to the user. It is also contemplated that the appliance of the present invention can be modified to permit bread making and other food processing in addition to the functions described herein.

DESCRIPTION OF THE SECOND EMBODIMENT

Figure 3:
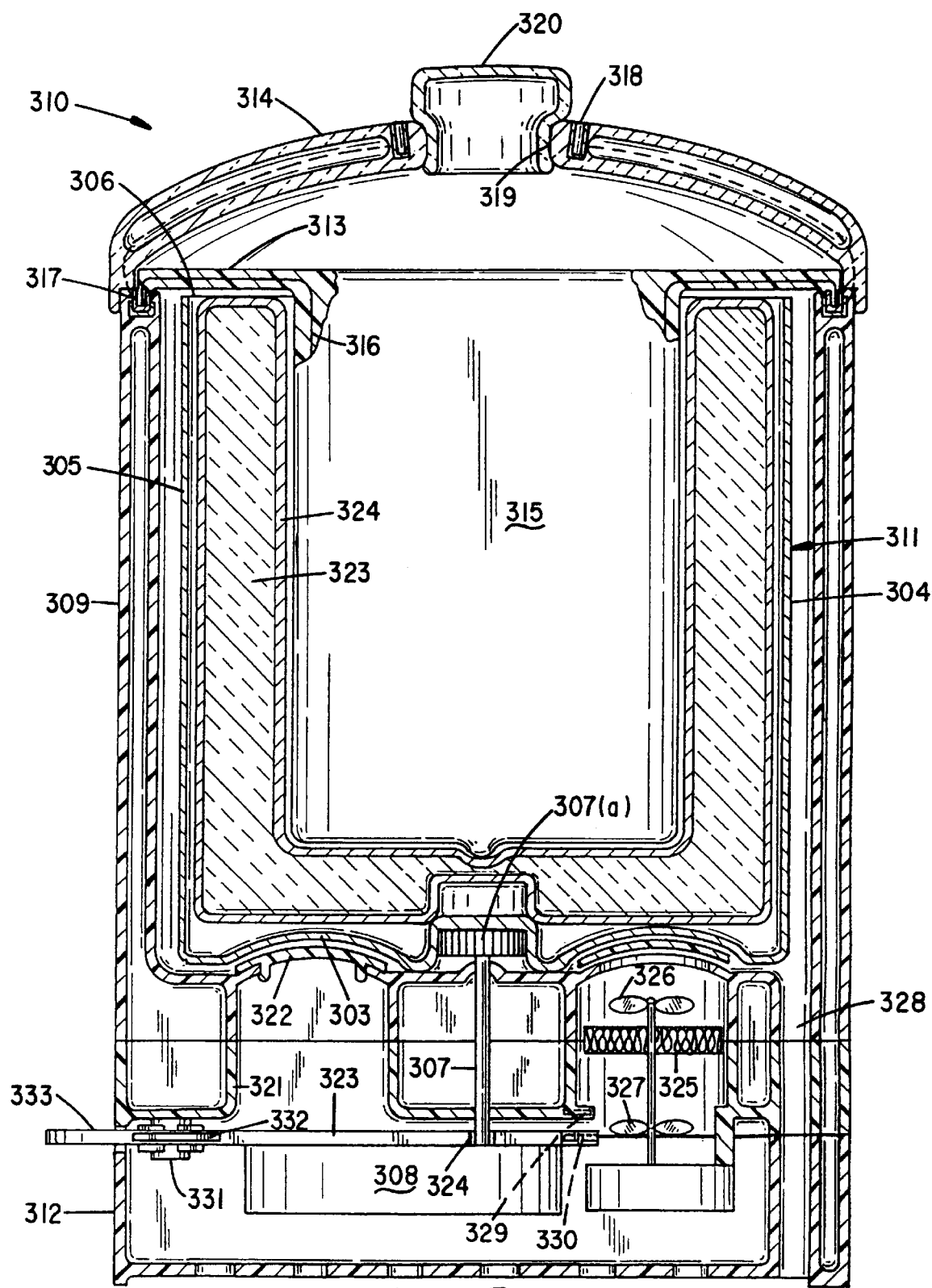
FIG. 3 is a vertical cross-sectional view of the second embodiment home yogurt/cheese making machine of the present invention.

Referring first to FIG. 3, there is indicated generally by numeral 310 a second embodiment of a home appliance useful in preparing yogurt, soft or hard frozen yogurt or ice cream, and cheese from a starter and either heated bottled milk or a mixture of dried milk and tap water. The machine is seen to comprise a culturing container 311 of generally non-circular (square or with baffles) configuration defined by a bottom 303 and mutually perpendicular side walls 304 and 305. The container 311 will preferably be molded or shaped from a suitable plastic or metal. The four walls, as at 304 and 305, define an open upper top 306 of non-cylindrical configuration. The bottom of the container is adapted centrally to be splined to a stub shaft 307 and is thereby able to be driven by the shaft of the motor 308 when it is energized.

Shown within container 311 is an optional freezing bowl 323 that is used when preparing such products as hard or soft frozen yogurt or ice cream. The freezing bowl 323, which is also of a non-cylindrical outer shape, is dimensioned to be insertable into the container 311. The freezing bowl 323 has a substantially cylindrical inner wall 324, preferably formed from microwave heatable stainless steel or aluminum. Disposed between the cylindrical inner wall 324 and the non-cylindrical outer wall and nearly filling it is a chemical mixture exhibiting a relatively high latent heat of fusion and a low coefficient of expansion upon changing from a liquid to a solid state. Prior to use, the insert 323 is adapted to be placed in the freezing compartment of a household refrigerator and chilled until the chemical material contained between the walls becomes frozen.

The stationary insulated housing 309, which is fastened to the stationary base 312, is also locked removably to a stationary paddle supporting rim 313, which in turn is roofed by the stationary removable cover 314.

Sized to fit atop the opening rim of the housing and non-rotatably and electrically keyed to it is a paddle 315, disposed within the mix in the container or freezing bowl. The machine of the present invention may also be constructed so that the stationary paddle 315 contains a thermostatically controlled electrical heating/warming element, here shown as a serpentine arrangement of nicrome wire 316.

The insulated cover member 314 is sized to fit atop the rim of the paddle support member and the container. It is preferably manufactured from a suitable plastic. When the cover is removed, liquid ingredients can be poured into the freezing bowl even while the paddle remains in place and the bowl is rotating. Also the cover is adapted to support an insulated, solenoid-valved container for liquid yogurt or cheese starter which may be utilized to automatically add starter subsequent to the pre-heating and cooling steps when unheated bottled milk is utilized. There are electrical connections at 317 and 318 between the housing and paddle and cover to facilitate plugging in the unit for timed delivery of a starter through the cover opening 319 when plug 320 is removed.

The insulated base 312 has at least one vent opening 321 formed through the thickness dimension thereof, with a removable vent cover 322. A further centrally disposed sleeve bearing is provided therethrough for receiving the stub shaft 307 of the motor drive member 308 therethrough. The stub shaft can be keyed to the container and/or the freezing bowl which are designed to be driven by the stub shaft.

Disposed in the base 312 and loosely surrounding the shaft 307 of the drive member is a rotatable occluding member 324 having an integrally formed sleeve bearing centrally disposed. The electrical motor with gear reduction 308 is fixed to the underside of the occluding member 324 and is arranged to rotate the container relative to the stationary paddle 315, housing 309 and base 312. A thermostatically controlled reversible heat exchanger 325 is also mounted within the base 312. Both internal 326 (within the housing) and external 327 (outside the insulation) fans are mounted in relation to the reversible heat exchanger. The heat exchanger is preferably a reversible polarity thermoelectric device capable of both heating and cooling. The appropriate switches are adapted to be connected, via printed or other wiring, to a control circuit also mounted on (in) the base. A drain hole as at 328 provides egress for any spillage of liquid occurring within the housing.

The occluding member 324 is arranged to shift between first and second positions. In the first position, the occluding member blocks the vent opening 321 and in its second position uncovers the same to expose the contents of the machine within the container 311 to the cooling air of a refrigerator in which the machine may be placed during use, assuming the vent cover 322 is removed. The reversible heat pump 325 may also be switched to the cooling mode, in which case the vent cover remains in place.

When in the first position, a permanent magnet 330 embedded in the occluding member 324 cooperates with a magnetic reed switch 329 disposed on the base 312 to maintain the reed switch 329 closed. When the occluding member 324 is made to shift to its second position, the reed switch 329 is no longer under the influence of the permanent magnet 330 and its contacts open.

A timing control circuit like that earlier described is disposed in the base 312 and is wired to an electromagnet 331 having first and second coils of differing numbers of turns, such that as many as three different magnitudes of magnetic attractive force can be applied, respectively causing a relatively moderate magnetic attraction to a weak permanent magnet 332 on the occluder 324 or, alternatively, one or two selectively greater attractive forces. Reciprocally, the weak permanent magnet 332 can apply a weak attractive force to the core of the inactive electromagnet 331.

A circuit like that depicted in the diagram of FIG. 8 may be used with the embodiment of FIG. 3 if the machine is only to be used in making yogurt or cheese.

In use for preparing non-frozen yogurt, a yogurt starter and either previously heated liquid milk or dry, powdered milk plus water, is poured into the container 311 and the cover 314 is placed on top. (Alternatively, non-heated milk can be utilized and heating and cooling and starter adding can be carried out automatically by the device prior to the machine's automatically proceeding on with the following operations). The occluding member in the base (occluder and motor and permanent magnets) is manually rotated in the clockwise direction (when viewed from above) by placing a finger against the tab 333 protruding through the base from the occluding member to thereby rotate the occluding member to its initial position blocking the vent openings 321. Without the vent cover, the assembly may then be placed within a refrigerator with the power cord extending through the soft, compressible gasket of the refrigerator door and plugged into a wall outlet. Alternatively, the device may be placed on the counter top, the electrical cord plugged in and, with the vent cover in place, the reversible heat exchanger permitted to function consecutively in both its warming and cooling modes. With the occluding member 324 in the position to occlude the opening 321, the permanent magnet 330 embedded in the occluder will cause the contacts of the normally open reed switch 329 to be closed. As such, current will flow through the warming element 325 and/or 316 in the paddle to warm the milk and starter mix within the container 311. At this time, permanent magnet 332 is attracted to the iron of the unenergized electromagnet 331 with a relatively weak force.

At relatively infrequent intervals, the timer control will cause the contacts 811 to also close for a comparatively short interval. Without limitation, the contacts 811 may close about every 15 minutes for a time interval of about two seconds. When the contacts 811 close, an electrical current is supplied not only to the warmer 316 and/or 325, but also to the motor 308. Upon energization of the motor 308, and assuming a stationary paddle 315, the shaft and stub shaft 307 will be rotated in the clockwise direction to also rotate the container 311 around the liquid mixture to thereby test the consistency of the constituents. After a few hours, the yogurt mixture will convert from a liquid to a somewhat firm gel. This transition occurs relatively rapidly.

Now, the next time that the timer contacts 811 are made to close, the motor will attempt to rotate the stub shaft 307 and the container which are keyed to one another. Because of the rectangular shape of the container 311, the container will not be able to rotate around the gel and will also be unable to swirl the gelled yogurt and, as a result, the motor 308 affixed to the occluding member 324 will overcome the relatively weak magnetic force provided by the magnet and will cause the occluder to rotate counterclockwise so as to uncover the vent opening 321, and simultaneously cause the contacts of the magnetic reed switch 329 to open. Opening of the contacts disconnects both the heating element and the timer from the power source and shuts off the motor 308, all as previously explained.

Exposure of the gelled yogurt in the container 311 to the cool air within the refrigerator, via the vent opening will allow the contents to cool rather rapidly, thereby terminating the incubation process at a time when the consistency and flavor are optimum. Alternatively, the polarity to the thermoelectric heated/cooler 325 may be reversed, similarly commencing cooling.

In making cheese, the controller time-ratio switch is adjusted and the motor 308 is made to run intermittently for approximately fifteen minutes and permitted to rest for approximately five minutes. After a period of time, the milk and starter mix will curdle and fall to the bottom of the container and agglutinate and become a solid mass. At this point, the cheese mass will inhibit rotation of the container in relation to the paddle 315. This causes the motor to now rotate the occluding member, opening the reed switch and disconnecting power from the motor and warming element and either opening up the vent if it is not further covered or switching on the cooling mode.

The operation thus far described involves the making of regular yogurt and cheese. By configuring the circuit as in the diagram of FIG. 9, additional capability is provided to the apparatus of FIG. 3. Specifically, it can be used to prepare not only yogurt and cheese, but also soft and hard frozen yogurt or ice cream in the same manner as earlier explained.

When it is desired to make soft frozen yogurt, the optional insert 323 is utilized. The freezing bowl 323 will have been thoroughly frozen in a freezer or in the freezing compartment of the refrigerator before it is placed into the container 311. After rotation has been started, previously prepared frozen yogurt mix is poured into the cylindrical cavity of the quick freeze insert 323, via the hole 319 in cover 314 or with the cover removed.

Once the consistency of the soft frozen yogurt becomes sufficiently stiff to overcome the attractive force due to current flowing through the coil $T_1$ of the electromagnet 901, the occluder 323 will again rotate due to the stalled condition of the bowl in relation to the paddle 315. The occluder will again reposition so as to open the reed switch contacts 913 and 914 to disconnect the motor 308 and to remove current from the coil $T_1$. While not shown, it is also contemplated that the machine of the present invention be provided with an audible signaling device which would sound so that the soft frozen yogurt can be removed from the freezing bowl 324 before the yogurt adheres to it due to the freezing action of the insert.

Also, while making hard frozen yogurt or ice cream, the machine of the present invention may be inserted into the refrigerator's freezer compartment. Given the fact that the coil $T_2$ of the electromagnet 901 has a greater number of turns than the coil $T_1$ which is active in making soft frozen yogurt, the electromagnet and the occluder magnet will be attracted to one another with an increased force. With switch 908 open, the warming element 909 (316 in FIG. 3) is not energized. Also, because switch 906 is closed, the timer circuit is no longer functional and the motor 308 will run continuously until such time as the magnetic reed switch 329 opens. As heat energy is removed from the yogurt mixture within the cylindrical compartment of the freezing bowl 323 by the chemical contained between the walls of the insert and by the action of the refrigerator's freezing compartment, the yogurt will become more and more firm until a point is reached wherein the scraper paddle 315, in attempting to scrape and stir the freezing yogurt, will overcome the force exerted by the coil $T_2$ of the electromagnet and the motor will then drive the occluding means 324 on which it is mounted so as to cause the magnetic reed switch contacts to open and thereby disconnect the motor and the coil $T_2$ from the power lines. Electrical resistance heating of the paddle and microwave heating of the inner wall of the freezing bowl may aid the process of removing hard frozen yogurt that has been neglected for some period of time from the freezing bowl.

When the machine of the embodiment of FIG. 3 is to be used in making Ricotta cheese, the freezing bowl is not used and, as earlier explained, the motor is run more continuously with a duty cycle in which it remains on for a relatively long interval and off for a somewhat shorter interval. The warming element will remain energized and the weak magnet will provide the attractive force between the base 312 and the occluding means 324. The milk and starter will be placed in the container 311 and the occluder positioned so as to occlude the opening 321 in the base and to cause the magnetic reed switch 329 to be closed. Because the mixture is being warmed and stirred by the stationary paddle in the irregular shaped rotating container over prolonged periods of time, a point will be reached wherein curd forms and gravitates to the bottom of the mix during non-stirring intervals and begins to agglutinate and form into a rather firm mass on the bottom of the container. When the process is complete to the point where this mass inhibits rotation, the increased resistance will be enough to overcome the attractive force afforded by the permanent magnet 332 and will result in the occluding means 324 shifting in position due to the action of the motor to the point where the magnetic reed switch 329 again opens to thereby disconnect the heating element 316 and the motor 308 from the household power source.

A modification would be to sense changes in the current drawn by the motor as the consistency of the product varies from a liquid to a gel or a solid and to use that sensed current change to control the movement of the occluding means and/or to shut off the current to the heating element and/or to the drive motor(s). A safety switch might be incorporated which would shut down all possibility of current flow whenever the cover is removed and, also, a reduced voltage might be utilized for all functions to avoid electrical shock to the user. It is also contemplated that the appliance of the present invention might be further modified to permit bread making and other rotation based food processing in addition to the functions described herein.

DESCRIPTION OF THE THIRD EMBODIMENT

Figure 4:
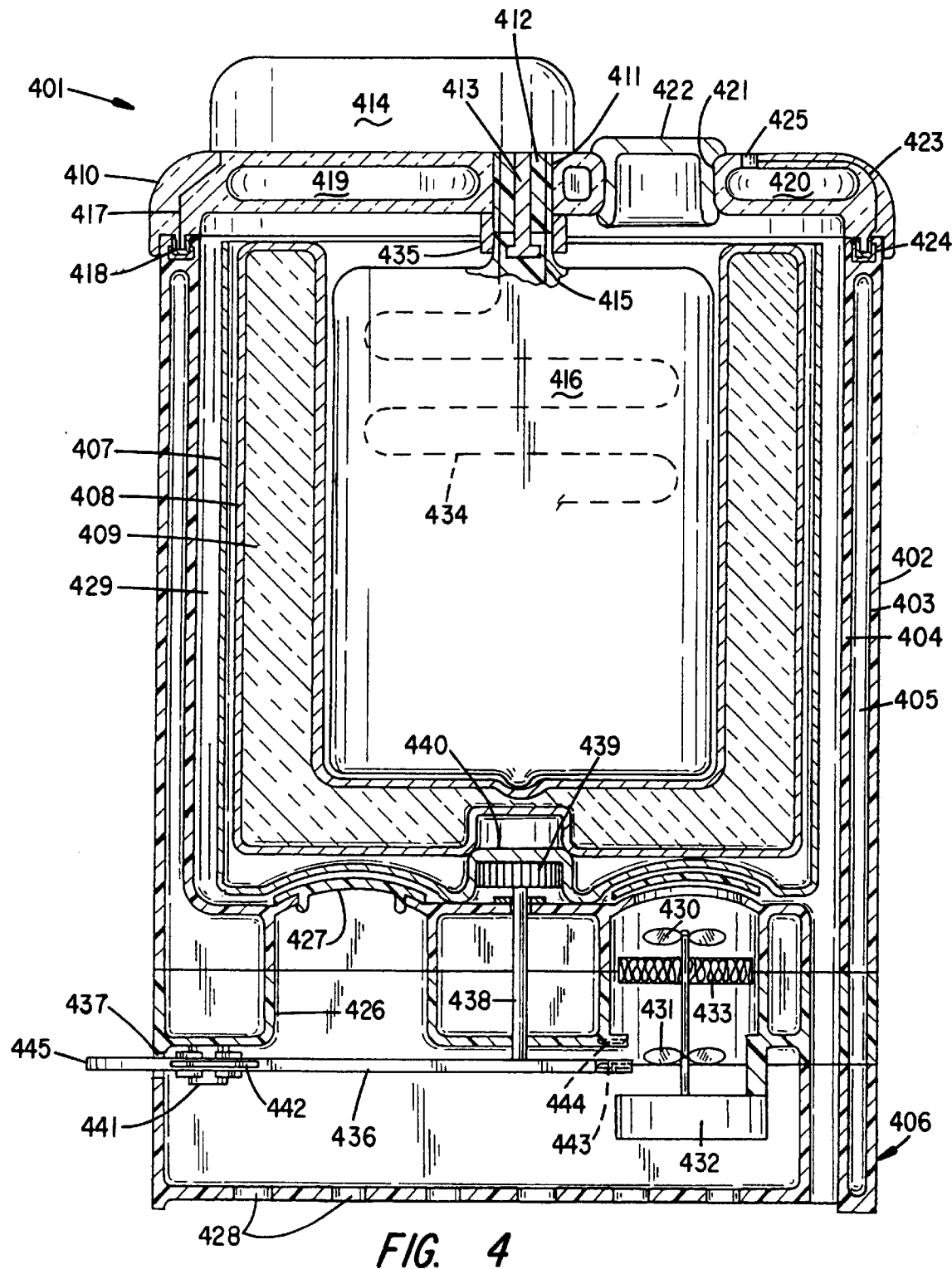
FIG. 4 is a cross-sectional view of the third embodiment home yogurt/cheese making machine of the present invention.

A third preferred embodiment of the invention is illustrated in the cross-sectional view of FIG. 4. It is similar in many respects to the previously described first and second embodiments, but differs therefrom primarily in the fact that the drive motor for a rotating paddle is disposed on the unit's cover member while the occluding device is located in the unit's base.

Referring to FIG. 4, there is indicated generally by numeral 401 a home appliance useful in the preparation of yogurt, soft frozen yogurt, hard frozen yogurt and Ricotta cheese. It comprises an outer, molded plastic housing 402 having an outer wall 403 and an inner wall 404 spaced from the outer wall, leaving an insulating air chamber 405. The housing includes a base 406 that, as in the earlier embodiments, includes a timer and control circuit like that illustrated in FIGS. 8 and 9.

Insertable within the housing 402 is a container 407. The container 407 is designed to have a non-circular cross-section. As in the earlier embodiments, the container 407 will typically hold the milk during the preparation of regular soft yogurt, but optionally, may receive a freezing bowl 408 therein. The freezing bowl 408 is a double-walled structure having a freezing liquid 409 contained between the walls. The freezing bowl is, again, used when it is desired to prepare soft frozen or hard frozen yogurt using the machine of the present invention.

A top member 410 is adapted to fit on the housing 402 in covering relation to its open top. The cover 410 includes a central aperture 411 containing a sleeve bearing 412 which journals a shaft 413 of an electric motor 414. The shaft 413 is designed to mate with a stem 415 of a rotatable paddle 416. The width of the paddle is designed to closely conform to the inner wall of the freezing bowl.

In order to deliver electrical power to the motor 414, an electrical conductor 417 connected to a motor terminal at one end also connects to an electrical contact 418 on the cover 410 and a mating contact on the housing 402. A further conductor, not shown, traverses through the housing wall into the base 406 for connection to the control circuit contained therein, like that shown at 38 in FIG. 1, but not specifically illustrated in FIG. 4.

The cover also is molded so as to include voids as at 419 and 420 which improves the thermal insulating properties of the cover. Also formed in the cover 410 is a circular opening 421 adapted to be sealed by a removable plug 422. With the plug removed, it is possible to pour ingredients through the opening 421 into the container 407 or the freezing bowl 408 as the case may be.

Further conductors, as at 423, connect between power contacts 424 on the cover and housing for applying power to a protected electrical socket 425 on the cover 410. This socket is adapted to receive a yogurt starter introducer device in FIGS. 10 and 11 having a solenoid actuated shutter which is made to open by the timed delivery of a control signal from the control circuit to the solenoid, via contacts 424 and 425 and the conductors 423 connecting them. With the shutter open, the contents of the starter adding device flow into the container 407 at an appropriate time in the cycle, all as will be further explained hereinbelow.

With continued reference to FIG. 4, it can be seen that there is formed in the base a passageway 426 through which cool air may flow when the removable plug 427 is absent. This plug is not used when the yogurt making appliance of the present invention is to be used in combination with a household refrigerator. Placement of the unit 401 in a household refrigerator would then permit cool air to flow through the apertures 428 in the base and through the aperture 426 to circulate in the space 429 between the inner wall 404 of the housing and the adjacent wall of the container 407.

By providing a thermoelectric heat exchanger, as at 433, it can assist in both the heating and cooling functions employed in the yogurt making process. The thermoelectric device 433, is of a well known type where when a voltage of first polarity is applied the unit will provide a heating function and when the polarity is reversed, cooling takes place. In addition to the heating that may be provided by the thermoelectric unit 433, the paddle 416 includes a heating element 434 therein which is adapted to be energized by way of slip rings 435. In that the paddle 416 remains in intimate contact with the yogurt constituents, the warmth given off thereby aids in the culturing process.

As in the earlier embodiments, there is shown cooperating with the vent opening 426 in the base, an occluder member 436 that extends through a radial slot 437 formed in the base 406. It is fixedly attached to a turntable shaft 438 that passes upward through the base and connects to an extendable splined drum 439 that mates with a recessed area 440 formed in the bottom of the container 407 or the freezing bowl 409. Thus, rotation of the container 407 will also result in rotation of the occluder member 436.

A detent in the form of an electromagnet 441, as before, cooperates with a permanent magnet 442 attached to the occluder member 436 for applying a predetermined force resisting rotation of the occluder member and, accordingly, rotation of the container 407 by virtue of the connection afforded by the shaft 438 and the spline drum 439 connecting the two.

The base further incorporates a magnetic reed switch 444 therein having contacts that are under the influence of a permanent magnet 443 mounted in the occluder member when the occluder member 436 is in a first orientation where the passageway 426 is being occluded. An extension 445 of the occluder protrudes laterally through the side wall of the base so that it is accessible for manually setting the device in its vent-covered starting mode.

In that the control circuit depicted in FIGS. 8 and 9 has already been explained in connection with preceding embodiments, no further explanation and mode of operation is deemed to be necessary for an understanding of the construction and operation of the embodiment of FIG. 4.

In use, with the occluder 436 initially set in its starting position and with the freezing bowl 409 removed, preheated bottled milk or a mixture of warm water and dried milk may be added into the container 407 through the opening 421 in the cover. At this point, the power plug may be connected to a source of household current for initially energizing the filament 434 in the paddle 416 as well as the thermoelectric heater/cooler 433 mounted in the unit's base. The combination or either of these two heat sources causes the ingredients to be warmed. At periodic intervals determined by the timer used in the control circuit, the motor 414 will be energized to rotate the paddle momentarily so as to ▓test▓ the consistency of the contents of the container. Stated as before, motor 414 may be energized for about two seconds every fifteen minutes for this purpose. When the point is reached where the ingredients begin to gel, because of the non-circular cross-sectional profile of the container 407, the paddle will become somewhat bonded to the container to the point where the container itself will begin to rotate with the paddle and thereby rotate the occluder member 436 against the magnetic force provided by the magnet 441 comprising the detent member. The occluder member thus will swing to a position no longer occluding the vent hole 426. Movement of the occluder 436 also increases the separation between the reed switch 444 and its cooperating permanent magnet 443, allowing the switch contacts of the reed switch to reverse, shutting off the motor and disconnecting the heating element from the power source.

Assuming that the unit has been placed in a refrigerator, cooling air can now propagate through ports 428 and through the vent 426 and up and around the container to terminate the culturing process at an optimum point.

If it is assumed that the device includes the thermoelectric unit 433, it would not be necessary to place the yogurt maker within a refrigerator. Here, movement of the occluder so as to cause the reed switch contacts to reverse may be used not only to shut off the motor 414, but also to reverse the polarity of the voltage applied to the thermoelectric unit from its heating mode to its cooling mode. The way in which soft frozen yogurt, hard frozen yogurt and Ricotta cheese can be made using the present invention applies equally to the embodiment of FIG. 4 and, hence, it is deemed unnecessary to repeat that explanation.

DESCRIPTION OF THE FOURTH EMBODIMENT

Figure 5:
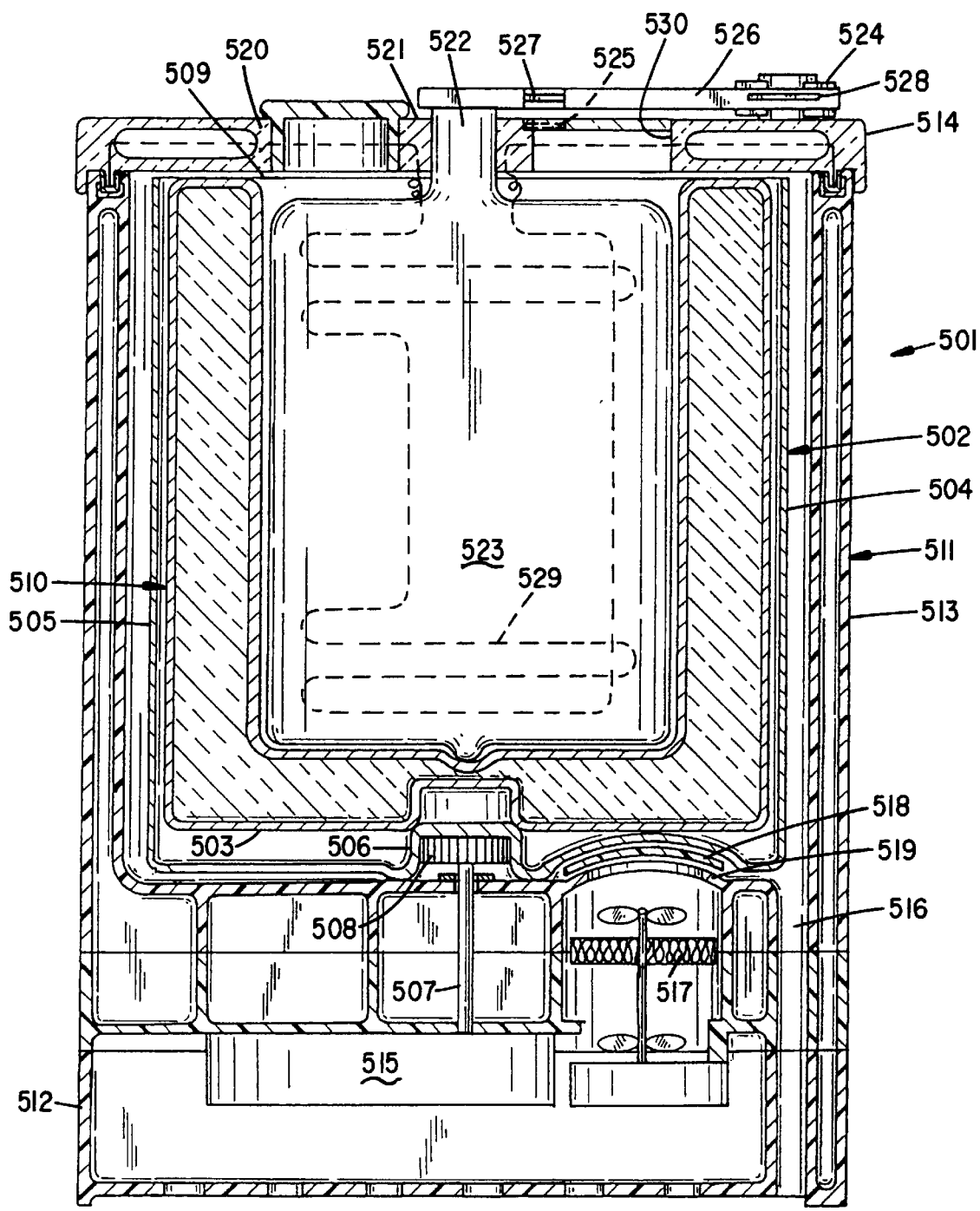
FIG. 5 is a cross-sectional view of the fourth embodiment home yogurt/cheese making machine of the present invention.

Referring first to FIG. 5, there is indicated generally by numeral 501 a further embodiment of a home appliance useful in preparing yogurt, soft or hard frozen yogurt or ice cream, and cheese from a starter and either bottled milk or a mixture of dried, powdered milk and water. As in the previously described embodiments, the machine is seen to comprise a rotatable container 502 of generally square or baffled irregular, non-cylindrical construction defined by a bottom 503 and mutually perpendicular side walls as at 504 and 505. The container 502 will preferably be molded or formed from a suitable plastic or metal. The bottom 503 is keyed centrally at 506 to mate with a stub drive shaft 507 having a splined hub 508 thereon. The four walls of container 502 define an open upper top 509.

Displayed within the container is an optional freezing bowl, indicated generally by numeral 510, that is used when preparing hard or soft frozen yogurt or ice cream. The freezing bowl is identical in construction to what has earlier been described and need not be explained further.

Surrounding the container 502 and/or the optional freezing bowl 510 is an insulated housing 511 composed of a base 512, enclosure 513 and cover 514. The insulated base contains a motor 515 with the stub drive shaft 507 that is keyed to interact with and support the container 502, or the freezing bowl 510. The motor is underneath the base and there is a bearing (not shown) for the shaft to pass through to the top of the base 512. There is also a drain duct 516 through the base. A thermoelectric heat exchanger 517 with a drip guard cover 518 is disposed in an air vent 519 that is formed in the top of the base 512. An air circulation path between the inside of the enclosure 513 and the outer wall of the container 502 is in fluid communication with air vent 519 allowing for the passage of warming and cooling air from the thermoelectric heat exchanger to act on the container 502.

The insulating cover member 514 is preferably fabricated from a suitable plastic and it has an opening 530 through the thickness dimension thereof. The cover further includes an additional opening through which liquid ingredients can be poured into the freezing bowl while the freezing bowl is rotating and the cover is in place thereon. The cover furthermore includes an integrally formed sleeve bearing 521 centrally disposed therethrough for receiving the shaft 522 of a paddle 523. The insulated cover furthermore supports an electromagnet 524 and a reed switch 525.

An occluding member 526 sits atop the cover, with two permanent magnets 527 and 528 embedded in and attached to its periphery for interaction with the reed switch 525 and the core of the detent electromagnet 524, respectively. The occluding member is integral with the paddle support shaft 522. During use, the paddle 523 is disposed within the container in a stationary, but potentially rotatable mode. The machine of the present invention may be constructed so that a warming-heating element as at 529 can be contained in the paddle, as well as or rather than having a thermoelectric heat exchanger 517 in the base.

A control circuit like that of FIG. 8 is disposed on the cover or in the base 512. It is also wired to the electromagnet having a pair of coils of differing numbers of turns such that two different magnitudes of magnetic attractive force can be applied for respectively causing a relatively moderate magnetic attraction to the weak permanent magnet 528 on the occluding member 526 or, alternatively, a greater attractive force.

The occluding member 526 is arranged to shift between first and second positions. In the first position, it blocks the vent hole 530 and in its second position uncovers this hole to expose the contents of the machine within the housing 511 to the cooling temperature of a refrigerator in which the machine may be placed during use. When in the first position, the permanent magnet 527 embedded in the occluding member cooperates with the magnetic reed switch 525 disposed on the cover to maintain the reed switch closed. When the occluder is made to shift to its second position, the reed switch is no longer under the influence of the permanent magnet and its contacts open.

From what has been described in explaining the operation of the embodiments of FIGS. 1 through 4, the reader will clearly understand how the present embodiment functions in preparing yogurt, frozen yogurt and Ricotta cheese.

Upon energization of the motor 515, the container 502 will be rotated in the clockwise direction to also relatively rotate the paddle within the liquid mixture to thereby test the consistency of the constituents. After a few hours, the yogurt mixture will convert from a liquid to a somewhat firm gel. This transition occurs relatively rapidly.

Now, the next time that the timer contacts are made to close, the motor will attempt to rotate the container. It will be impossible for the container to swirl a gel around the paddle and because of the irregular shape of the container and the shape of the paddle, the container and paddle will in effect be locked together. As a result, the motor being keyed to the container will overcome the relatively weak magnetic force provided by magnet 528 and will cause the paddle and occluder to rotate so as to uncover the vent opening 530 and simultaneously cause the contacts of the magnetic reed switch 525 to open. Opening of the contacts disconnects both the warming element and the controller/timer from the power source and thereby shuts off the motor.

Exposure of the gelled yogurt in the container 502 to the cool air within the refrigerator, via the now open vent will allow the contents to cool rather rapidly, thereby terminating the incubation process at a time when the consistency and flavor are optimum.

DESCRIPTION OF THE FIFTH EMBODIMENT

Figure 6:
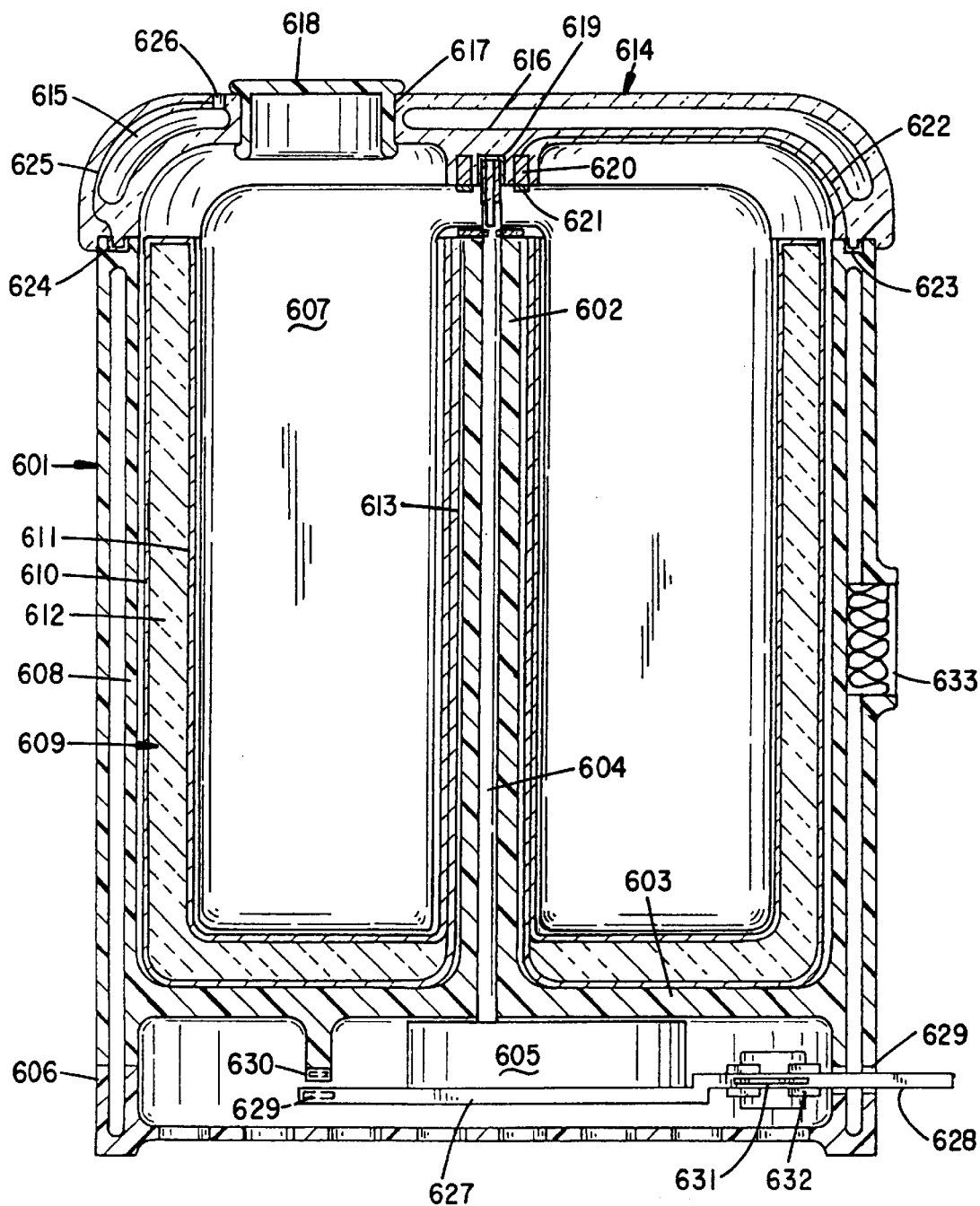
FIG. 6 is a cross-sectional view of the fifth embodiment home yogurt/cheese making machine of the present invention.

Referring next to FIG. 6, there is shown a fifth embodiment of the invention. It resembles the second embodiment (FIG. 3) in that the drive motor and occluder are disposed in the base. However, it differs therefrom in the manner in which relative motion is created between the container and the paddle. In the embodiment of FIG. 3, the container is adapted to be rotated by the motor, whereas in the embodiment of FIG. 6, the container remains stationary and it is the paddle that is the motor-driven member.

In implementing the yogurt maker of FIG. 6, the outer molded plastic housing 601 has an integrally formed, centrally disposed tubular center post 602 projecting upwardly from the housing base 603. Contained within the central bore of the tubular center post 602 is a drive shaft 604 that is adapted to be driven by the motor/gear reduction device 605 located in the base portion 606 of the outer housing 601. Affixed to the shaft 604 proximate its upper end is a split paddle 607, which, during use, fits within the chamber defined by the inner wall 608 of the housing 601 or within a specially formed freezing bowl 609 in those instances where the machine is being used to prepare soft or hard frozen yogurt.

The freezing bowl 609 has an outer wall 610 and an inner wall 611 that are spaced apart from one another, allowing a freezable liquid 612 to be trapped there between. The inner and outer walls 610 and 611 abut one another in the center of the freezing bowl and form an upwardly extending tubular projection 613 whose inside diameter is slightly greater than the outside diameter of the molded plastic center post 602. As such, the freezing bowl 609 can be inserted into the chamber defined by the outer housing by slipping the freezing bowl over the center post 602.

A cover 614 is designed to fit onto the open upper end of the housing 601 in covering relation thereto. Voids, as at 615 and 616, are formed in the top to add to its insulating qualities. An opening is formed through the top 614 at 617, allowing ingredients to be poured into the container or freezing bowl as the machine is operating. A cap or plug 618 can be used to seal the opening 617.

The top 614 also includes a bearing 619 into which the upper end of the shaft 604 is fitted. Furthermore, electrical slip rings 620 and 621 mounted in the cover and in the paddle, respectively, permit an electrical current to flow from a conductor 622 disposed within the cover to a heating element (not shown) disposed within the paddle 607. Also not visible in the embodiment of FIG. 6 are conductors leading from the power cord through the housing 601 to mating contacts 623 and 624 between the cover 614 and the upper rim of the housing 601. Again, in FIG. 6, provision is made for positioning a yogurt starter adder device atop the cover 614. Specifically, and as earlier described, the adder device includes a solenoid actuated shutter at the base of an insulated funnel which can fit through the opening 617 when the plug 618 is removed. An electrical connection to the solenoid is provided via contact 624, conductor 625 and socket 626 into which contacts on the starter adder device are insertable.

The motor 605 is shown as being affixed to an occluder member 627 and it has a handle portion 628 extending out through a slot 629 formed in the base 606 of the housing. Mounted on the occluder 627 is a permanent magnet 629 adapted to cooperate with a magnetic reed switch 630 affixed to the housing closely adjacent the reed switch when the occluder is in a first position. The occluder also supports a permanent magnet 631 positioned to cooperate with a pair of coils of an electromagnet 632. The control circuit for the embodiment of FIG. 6 is the same as for the previous embodiments and is shown in detail in FIGS. 8 and 9. In that the construction and mode of operation of that control circuit has already been explained in conjunction with the description of the earlier embodiments, it is deemed unnecessary to repeat that description. Suffice it to say, that when the machine is first turned on, the yogurt mix is maintained warm by the resistance element disposed in the paddle 607 and/or by a thermoelectric heat exchanger 633 shown mounted in the side wall of the housing 601. Periodically, the timer portion of the control circuit closes contacts for energizing the motor 605 to thereby test the consistency of the yogurt mix as culturing takes place. When the point is reached in the culturing process where the yogurt begins to gel, a resistance is imparted to the paddle 607 causing the paddle to stall but with the motor 605 continuing to run, the occluder pivots from its home position to a position which breaks the magnetic attraction between the reed switch 630 and the permanent magnet 629 to thereby disconnect the motor and timer from the electrical supply and reversing the polarity of the voltage applied to the thermoelectric unit causing it to cool rather than warm.

DESCRIPTION OF THE SIXTH EMBODIMENT

Figure 7:
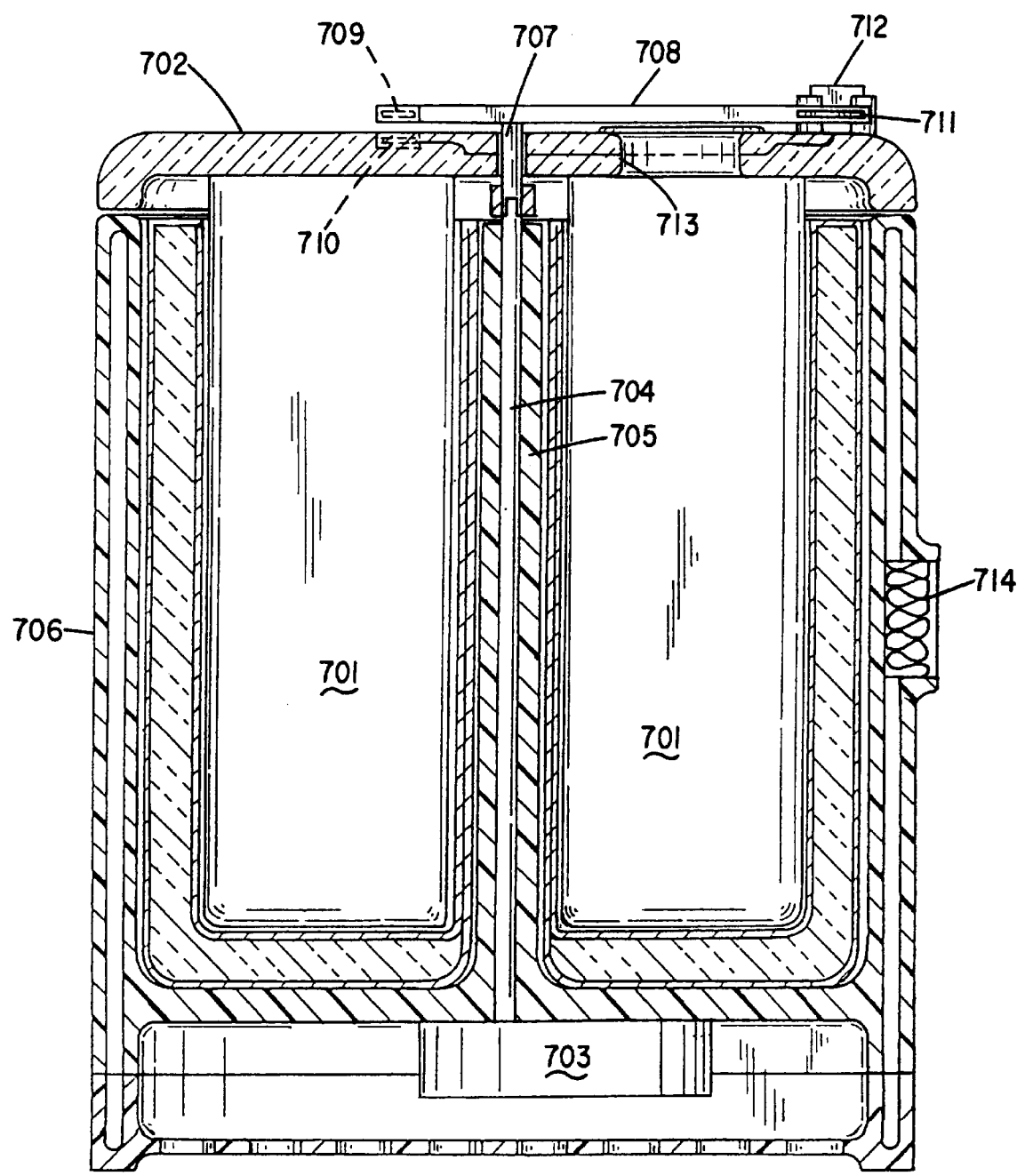
FIG. 7 is a cross-sectional view of the sixth embodiment home yogurt/cheese making machine of the present invention.

Comparing the yogurt maker illustrated in FIG. 7 with that in FIG. 6 and having described the earlier embodiments make it apparent that the only substantial difference is that the occluder device is moved to the housing's top. In this arrangement, the split paddle 701 is molded integrally with the cover 702. The motor 703 has its output shaft 704 extending upwardly through the tubular center post 705 of the molded plastic housing 706. This shaft is keyed to a downwardly projecting stem 707 of the occluder 708.

The occluder supports a permanent magnet 709 thereon which cooperates with a magnetic reed switch 710 mounted in a recess of the cover 702 when the occluder 708 is in its home position. Also mounted in the cover 702 is an electromagnet 712 adapted to cooperate with a permanent magnet 711 disposed on the occluder.

In this apparatus, when the motor 703 is driven, it rotates the occluder member 708 which is magnetically coupled to the top 702 by the attractive force between the permanent magnet 711 and the core of the electromagnet 712. Thus, the top 702 rotates with the occluder and with the paddle member 701 until a point is reached in the cycle where the yogurt mix begins to firm-up and gel. The gelling of the yogurt mix stalls the paddles 701 and the cover 702 is prevented from rotating. However, the occluder, being driven by the motor 703 breaks the magnetic coupling and rotates out of covering relation relative to the vent opening 713. That rotation of the occluder 708 relative to the top 702 also causes the reed switch contact 710 to open to shut off the motor 703 and to disconnect the power from the heating element disposed in the split paddle 701. Where the unit is disposed in a refrigerator, cooling air passes through the vent 713 to terminate the culturing process. If the unit is to be used on a countertop, then, as with earlier embodiments, the thermoelectric heat exchanger 714 has its power reversed when the occluder swings independently of the cover so as to function in a cooling mode rather than a heating mode.

In any one of the described embodiments, rather than testing the consistency of the milk product by its viscosity, a pH or chemical change measuring device may be used to detect when the hydrogen ion concentration of the mix reaches a predetermined level of acidity or other chemical change occurs and for automatically turning off the warming and initiating cooling thereof in response to such condition. As mentioned earlier, the motor current can be sensed using a comparitor circuit. As the yogurt gels, the motor current increases and when it exceeds a threshold established by the comparitor, a control signal is developed that can be used to terminate warming and initiate cooling.

YOGURT STARTER INTRODUCER

Figure 10:
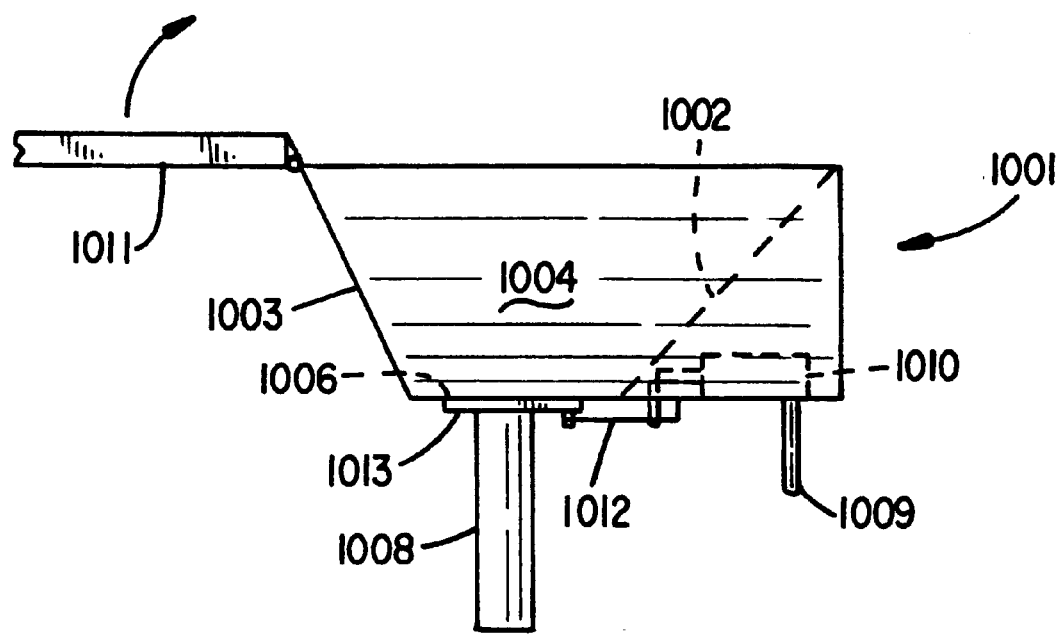
FIG. 10 is a side elevational view of a yogurt "starter" adding attachment for the yogurt/cheese making machine.
Figure 11:
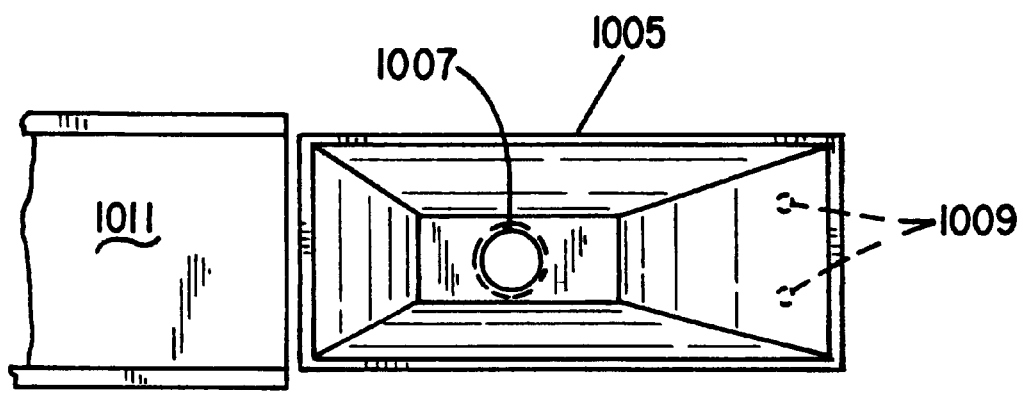
FIG. 11 is a top plan view of the attachment of FIG. 10.

FIGS. 10 and 11 respectively show a side elevational view and a top view of an attachment for the preceding six embodiments of the invention which allows for the automatic introduction at a predetermined time point in the cycle of operation of a yogurt starter mix. The starter mix may comprise yogurt purchased from a grocery store and may comprise a small amount of a previously prepared batch of yogurt. The introducer comprises a molded plastic container indicated generally by numeral 1001 and, as shown in FIG. 11, it includes downwardly and inwardly sloping end and side walls 1005. Each of these side walls terminates at its lower end in a rectangular base 1006 having an aperture 1007 formed therethrough. Aligned with this aperture is a downwardly extending tube 1008 that is adapted to fit through an opening in the top of the housing of the yogurt maker when plug-in electrical contacts 1009 are fitted into an electrical jack or socket formed on the cover of the housing.

The electrical contacts 1009 are connected by electrical conductors (not shown) to the terminals of a solenoid device 1010 disposed within a compartment of the device 1001. A hinged lid, as at 1011 is used to close the container 1001 following the placement of the starter material within the adder device.

The solenoid 1010 is operatively coupled by a linkage 1012 to a shutter 1013 that normally occludes the aperture 1007, preventing the starter material from flowing down through the tube 1008. Upon the timed actuation of the solenoid 1010, however, the shutter 1013 swings out of the way of the aperture 1007 and allowing the starter material to flow through the tube 1008 into the container of the yogurt making machine. Rather than employing a solenoid to actuate the shutter 1013, a current activated bimetal strip may be used instead.

As should be apparent from what has been described, the device of FIGS. 10 and 11 is adapted to be plugged into the sockets 318 of the embodiment of FIG. 3, socket 425 in the embodiment of FIG. 4 and socket 626 in the embodiment of FIG. 6. A set of contacts (not shown) in the solid state timer 810 may be used to complete a circuit between the power supply and the solenoid 1010 (or bimetal strip) at an appropriate time when the contents in the container of the yogurt preparing machine are at an appropriate culturing temperature.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

The above descriptions are thus intended by way of example only and are not intended to limit the present invention in any way except as set forth in the following claims.

What is claimed is:

1. A method for preparing yogurt, comprising the steps of:

(a) providing an appliance comprising a housing having a base and side walls defining a warming chamber with an open top, said chamber adapted to be warmed by an electrical element, a cover for said open top, one of the cover and the base having an air vent opening therein, a paddle member supported for relative movement relative to the base and side walls of the housing, an occluding member movable from a first position occluding the air vent opening to a second position in which the air vent opening is uncovered, and a drive motor operatively coupled for imparting movement to the paddle member and occluding member;

(b) introducing a milk product and a yogurt starter into the warming chamber;

(c) placing the appliance of step (a) containing the milk product and yogurt starter of step (b) in a cooling environment;

(d) applying power to the electrical element;

(e) periodically applying relative motion between the paddle member and the housing for testing the consistency of the milk product within the warming chamber; and (f) automatically moving the occluding member to the second position and disconnecting the electrical element from the source of electrical power upon a transition of the milk product to a gel consistency.

2. The method of claim 1 wherein relative motion between the paddle member and the housing is imparted for a period of from 1 to 10 seconds about every 15 minutes.

3. A method for automatically preparing yogurt from a milk product through a culturing process, comprising the steps of:

(a) providing a kitchen appliance having a housing defining a first chamber that is adapted to be selectively warmed to a predetermined culturing temperature by an electrical current and subsequently force-cooled to a temperature lower than the culturing temperature, the appliance including a paddle, a means for periodically rotating the chamber relative to the paddle and a second chamber for containing a yogurt starter material, the second chamber disposed about the first chamber and including a shutter for controlling flow of the starter material from the second chamber into the first chamber;

(b) placing the milk product in the first chamber;

(c) placing the starter material in the second chamber;

(d) turning on the electrical current to provide heating of the milk product to the culturing temperature;

(e) actuating the shutter to empty the starter material into the milk product;

(f) periodically rotating the chamber relative to the paddle in accordance with a predetermined duty cycle having a relatively long off-period compared to an on period in which the rotation takes place;

(g) automatically turning off the electrical current upon the milk product reaching a thickened state as sensed by the paddle; and (h) thereafter initiating the force cooling of the milk product.

* * * * *